United States Patent
Norton, Jr. et al.

(10) Patent No.: US 11,199,879 B2
(45) Date of Patent: Dec. 14, 2021

(54) COMPUTING DEVICE WATER PROTECTION

(71) Applicant: Lenovo (Singapore) Pte. Ltd., Singapore (SG)

(72) Inventors: Robert James Norton, Jr., Raleigh, NC (US); Scott Wentao Li, Cary, NC (US); Robert James Kapinos, Durham, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 52 days.

(21) Appl. No.: 16/732,111

(22) Filed: Dec. 31, 2019

(65) Prior Publication Data

US 2021/0200272 A1 Jul. 1, 2021

(51) Int. Cl.
G06F 1/16 (2006.01)
G11B 33/08 (2006.01)
C08L 101/14 (2006.01)

(52) U.S. Cl.
CPC .......... *G06F 1/1656* (2013.01); *C08L 101/14* (2013.01); *G06F 1/1616* (2013.01); *G11B 33/08* (2013.01)

(58) Field of Classification Search
CPC ...... H05K 5/068; H05K 5/069; H05K 5/0086; H05K 5/0217; H04B 1/3827; H04B 2001/3894; G06F 1/1656
See application file for complete search history.

(56) References Cited

U.S. PATENT DOCUMENTS

| 5,472,761 | A | 12/1995 | Goldberg et al. | |
| 6,633,986 | B1 * | 10/2003 | Sellers | G06F 1/1616 340/604 |
| 7,811,270 | B2 | 10/2010 | Rosenfeld et al. | |
| 10,264,693 | B1 * | 4/2019 | Gilmore | H05K 5/0086 |
| 2008/0094232 | A1 * | 4/2008 | Yokote | G06F 1/1662 340/604 |
| 2008/0202905 | A1 * | 8/2008 | Juan | H01H 13/86 200/302.2 |
| 2011/0308843 | A1 * | 12/2011 | Okumura | G06F 1/1656 174/256 |
| 2012/0051007 | A1 * | 3/2012 | Alvarez | H05K 3/284 361/752 |
| 2018/0024594 | A1 * | 1/2018 | Park | G06F 1/1656 156/60 |
| 2018/0052491 | A1 * | 2/2018 | Kapinos | G06F 1/1626 |

(Continued)

OTHER PUBLICATIONS

CUI Inc, USB Receptacle, UJ31-CH-3-MSMT-TR-67, Jul. 11, 2019 (6 pages).

(Continued)

*Primary Examiner* — Adrian S Wilson
(74) *Attorney, Agent, or Firm* — Brian J. Pangrle

(57) ABSTRACT

A device can include a housing that defines an interior space and an exterior space and that includes air passages between the interior space and the exterior space; electronic components disposed in the interior space of the housing, where the electronic components include a processor and memory accessible to the processor; and a material that, upon exposure to water, transitions from a first state to a second state that protects at least one of the electronic components from damage.

19 Claims, 14 Drawing Sheets

(56) References Cited

U.S. PATENT DOCUMENTS

2018/0068808 A1* 3/2018 Wang .................. H01H 13/14
2018/0352664 A1* 12/2018 Park .................... B32B 27/16
2020/0183455 A1* 6/2020 Park .................... G06F 1/1656
2021/0100122 A1* 4/2021 Wang .................. H05K 5/069

OTHER PUBLICATIONS

Elliott, BASF AG, Superabsorbent Polymers, 2004 (13 pages).
EXTRASORB, Super Absorbent Polymer, 2018 (5 pages).
Shin-Etsu, Characteristics of Silicone Rubber Compounds, Aug. 2016 (16 pages).
Whitmore, D.L., Nonwovens Containing Immobilized Superabsorbent Polymer Particles, INJ Fall 2003 (6 pages).
Donaldson Company, Inc., Filtration Solutions, SAP (Super Absorbent Polymer) White Paper, Jun. 23, 2009 (5 pages).

* cited by examiner

COMPUTING DEVICE WATER PROTECTION

TECHNICAL FIELD

Subject matter disclosed herein generally relates to technology for computing or other devices.

BACKGROUND

Various types of devices, display devices, computing and display devices, etc., exist that can be damaged upon exposure to liquid such as water.

SUMMARY

A device can include a housing that defines an interior space and an exterior space and that includes air passages between the interior space and the exterior space; electronic components disposed in the interior space of the housing, where the electronic components include a processor and memory accessible to the processor; and a material that, upon exposure to water, transitions from a first state to a second state that protects at least one of the electronic components from damage. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
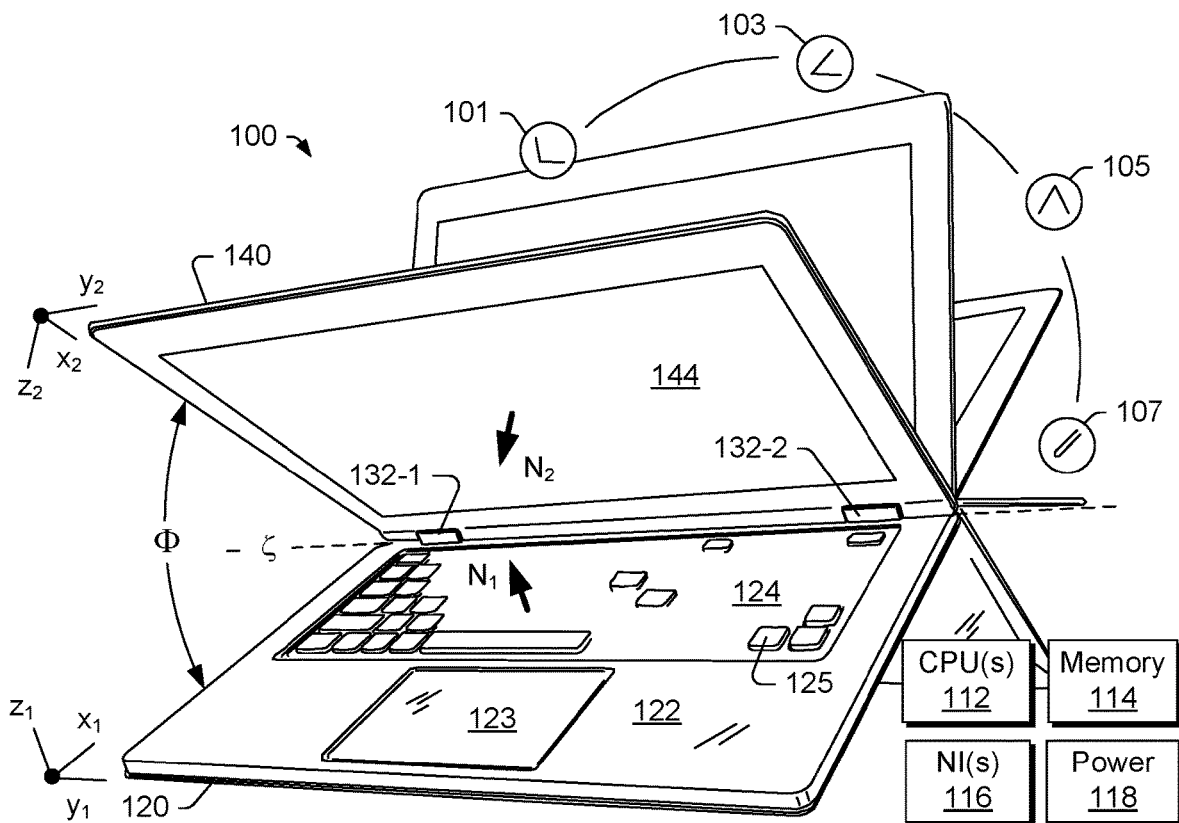
FIG. 1 is a diagram of an example of a device.
Figure 1:
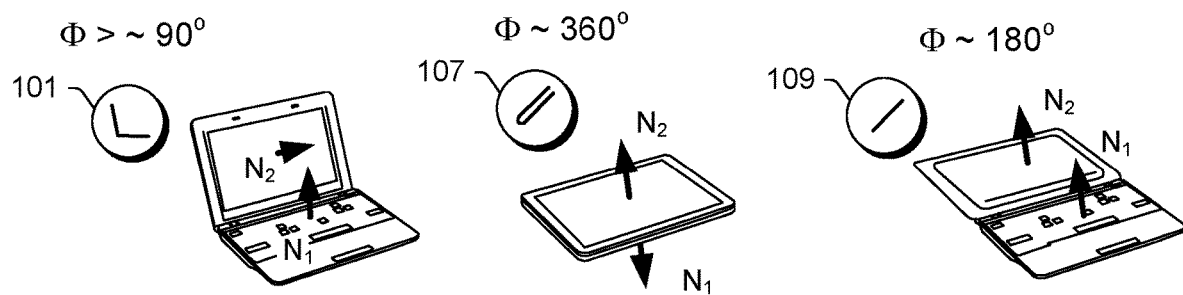

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
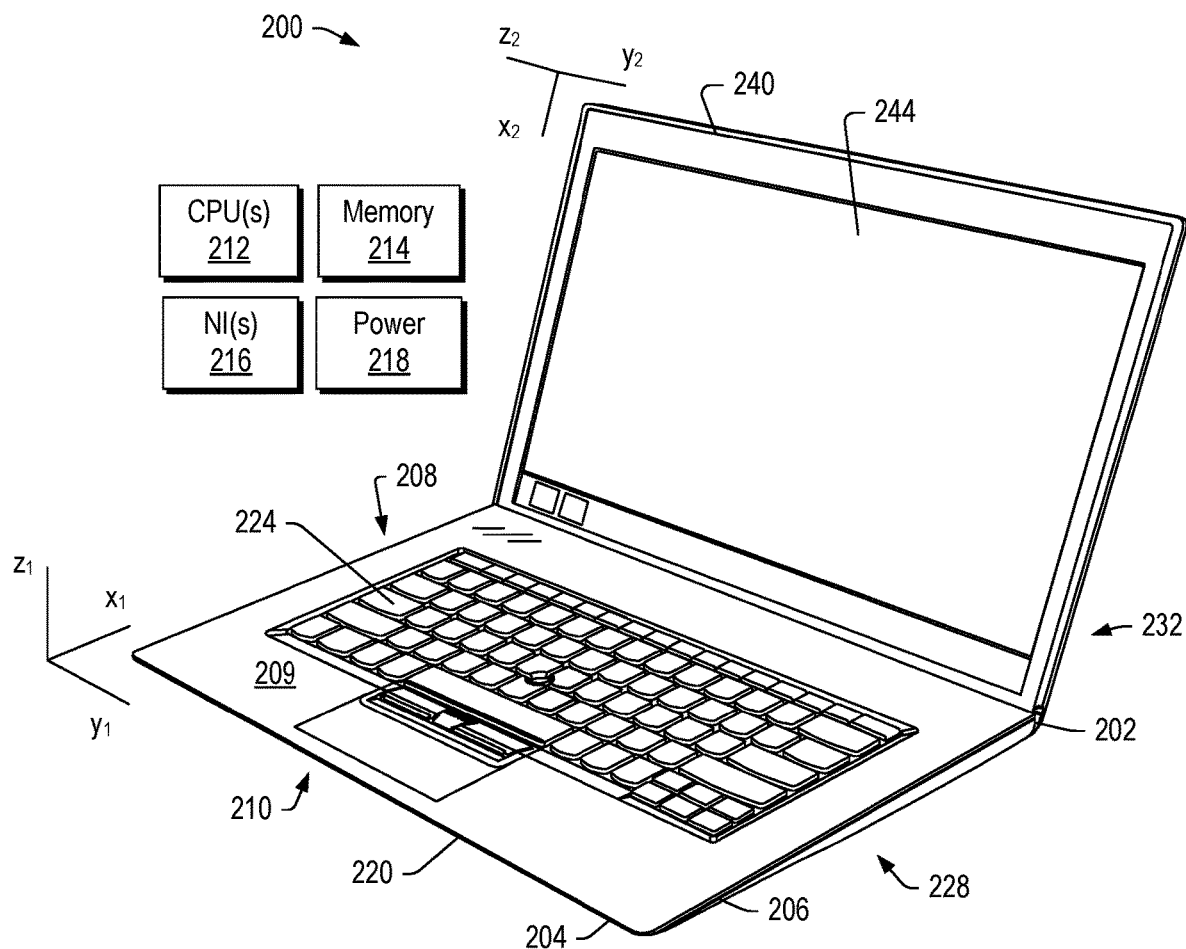
FIG. 2 is a diagram of an example of a device.

FIG. 2 shows an example of a device 200 that includes various features of the device 100 of FIG. 1.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

A computing device such as, for example, the device 200, can be exposed to water where the water may damage one or more components via one or more mechanisms. For example, where the water is electrically conductive due to presence of ions, the water can become a connector that can bridge components. For example, consider bridging of a power supply component and a memory component where current can flow in a detrimental manner that places the memory component at risk of memory loss, inoperability, etc.

Pure water is a poor conductor of electricity. For example, distilled water in equilibrium with carbon dioxide of the air has a conductivity of about 10×10-6 W-1*m-1 (20 dS/m). As electrical current can be transported by ions in solution, the conductivity of water tends to increase as the concentration of ions increases. Thus, the conductivity tends to increase as water dissolved ionic species increase (e.g., ultrapure water 5.5×10-6 S/m; drinking water 0.005 to 0.05 S/m; sea water 5 S/m).

Liquid spills remain one of the most destructive types of accidents to affect electronics. If water can find a way to certain components then it is likely that such components will be destroyed. In general, chance of damage is increased if there is current flowing through the component.

In various examples, a computing device can include material, which can be one or more materials, which may be in the form of a product or products. In such examples, one or more of the products can be positioned within a computing device, for example, in proximity to open ports and electrical components. Where a product gets wet, for example, due to contact with water in liquid form, an additional action can happen. In various examples, "material" can mean a single material or multiple materials. For example, "material" can mean one or more materials.

As an example, an action can include cutting current upon a product getting wet. For example, consider a product that includes a water as a liquid activated material like that utilized in flood bags. In such an example, the product can expand such that one or more conductive members are separated, for example, by a gap across which current is unlikely to flow (e.g., current at levels experienced in tablets, notebook computers, etc.).

As another example, an expansion of a product can occur in a manner that helps to cover and protect one or more components (e.g., a processor, memory, a drive, etc.).

As an example, a combined approach can be taken where a computing device includes one or more products that can act responsive to exposure to water as a liquid for multiple purposes such as, for example, cutting current to one or more components and expanding to cover one or more components.

As an example, a product can be included in a computing device where the product expands to seal one or more entrances to the computing device, which may be relatively small areas. Such sealing may act to hinder intrusion of further amounts of water.

As an example, a product may be position at least in part between a keyboard and system board (e.g., a motherboard, etc.) in a housing of a notebook computer (e.g., a keyboard housing) such that the product can serve as a barrier that can expand upon liquid being spilled onto the keyboard, where the product can help to mitigate and minimize damage to an expensive system board and one or more other components.

As an example, a product can be reversible in size (e.g., thickness, etc.). For example, in a wet state a product can be expanded where upon drying the product may be in a dry state where the product shrinks in size. For example, a product may shrink back down after absorbed liquid evaporates and/or is removed through use of one or more other mechanisms.

As an example, a product can include a material such as a polymeric material in a substrate where the material can absorbs water. As an example, the polymeric material may be a superabsorbent polymeric material, which may be referred to as a SAP. Various techniques exist to manufacture a product that can absorb water. For example, consider a powder-based technique, an in-situ polymerization technique, etc.

As to an IUPAC definition, a superabsorbent polymer (SAP) is a polymer that can absorb and retain extremely large amounts of a liquid relative to its own mass. In various examples, a SAP is a water absorbing SAP; noting that some SAPs are organic liquid absorbent SAPs. As to swelling, a swelling ratio of a superabsorbent polymer may be as high as 1000:1. As an example, regarding a lower limit, a SAP material may be capable of absorbing and retaining at least about three times its weight in water (e.g., under a pressure of approximately 0.5 psi) or, for example, at least about ten times its weight in water (e.g., under a pressure of approximately 0.5 psi). In various instances, SAPs for water are polyelectrolytic materials.

As an example, a SAP may be in the form of a slush powder, which can absorb and retain extremely large amounts of a liquid relative to its own mass. Water-absorbing polymers, which are classified as hydrogels when mixed, absorb aqueous solutions through hydrogen bonding with water molecules. A SAP's ability to absorb water can depend on ionic concentration of an aqueous solution. In deionized and distilled water, an example SAP may absorb 300 times its weight (e.g., from 30 to 60 times its own volume) and can become up to 99.9 percent liquid, but when put into a 0.9% saline solution, the absorbency of such an example SAP can drop (e.g., to approximately 50 times its weight). The presence of valence cations in a solution can impede a polymer's ability to bond with the water molecule.

As an example, total absorbency and swelling capacity can be controlled by type and degree of cross-linkers used to make a material that can be a gel in a wet state. For example, low-density cross-linked SAPs generally have a higher absorbent capacity and swell to a larger degree. These types of SAPs can have a softer and stickier gel formation. As an example, high cross-link density polymers can exhibit lower absorbent capacity and swell, where gel strength can be firmer and can maintain particle shape even under modest pressure.

SAPs find use in personal disposable hygiene products, such as baby diapers, adult diapers and sanitary napkins. SAP also find use in blocking water penetration in underground power and underground communications cables, in self-healing concrete, horticultural water retention agents, control of spill and waste aqueous fluid, and artificial snow for motion picture and stage production.

As to mechanism(s) of action, a SAP can form a diffusion gradient due to neutralization of a backbone of a polymer by potassium or sodium. Water molecules can be attracted to the network because of this diffusion gradient. Cross-linking in a network can hinder chain straightening to thereby result in the expansion of the particles as the water molecules move through the network. As an example, a hydrophilic carboxylic acid group (—COOH) can form a backbone that can make a SAP quite hydrophilic. When water is added to an SAP, hydration can occur and formation of hydrogen bonds which hold water tightly.

As an example, a water absorbent material can include one or more of polyacrylate, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile. As an example, a method can include polymerization. For example, a method can include at least in part polymerizing a monomer to form a water absorbent material. As an example, a method can include making a product that includes one or more water absorbent materials. For example, a product can include a substrate and one or more water absorbent materials supported at least in part by the substrate. In such an example, a water absorbent material may be provided and/or made via one or more processes. For example, consider a powder impregnation process, an in-situ polymerization process, etc. As an example, a substrate can include organic material and/or inorganic material. As an example, a substrate can be characterized by one or more properties, which can include density, fiber, non-fiber, weave, size, sizes, hydrophilicity, hydrophobicity, lamination, etc.

As to a superabsorbent polymeric material, such a material may be formed using solution polymerization of partially neutralized acrylic acid along with a small amount of a crosslinking agent in water. As an example, a polymerization process can result in a water insoluble, water swellable gel containing approximately 25 percent to approximately 40 percent solids, which can be dried such that it can be utilized as a water absorbent material. In such an example, processing can occur prior to drying such as, for example, cutting or otherwise forming smaller pieces of the gel.

As an example, a water swellable gel can be cut, dried, milled and sifted to produce a powdered SAP product. As an example, such a powder can have a desired particle size, particle shape, etc. For example, consider particle sizes ranging between approximately 1 microns to approximately 1 mm or more. As an example, particle sizes can range from approximately 100 microns to approximately 800 microns.

As an example, an SAP process can be in-situ, for example, where a partially neutralized acrylic acid monomer solution is applied to a nonwoven substrate and polymerized. In such an example, a nonwoven web may be fed to the process either as a pre-manufactured roll good or made in-line from bulk staple fiber using a carding operation. In such an example, the monomer solution may be applied to the web using one or more of a variety of application techniques such as brush coating, pressurized liquid spray, air assisted spray or airless spray. As an example, initiation of polymerization may be carried out by using a redox package, thermal initiation, UV, electron beam radiation or a combination of methods. As an example, partial drying of a web may be achieved using the heat of polymerization if the acrylic acid concentration of the monomer solution is above a certain level (e.g., above approximately 30 percent, etc.). As to moisture content of a product, it may be adjusted to a desired level using through-air, air flotation, and/or forced-air infrared dryer. As an example, a dried product may be mechanically softened and slit to a desired use width and wound.

As an example, a product can be manufactured to be zoned. For example, consider a process that can form zoned SAP gradients and/or strategic placement of SAP, which may include one or more different SAP materials with different performance properties.

As an example, SAP particulate material can be blended with one or more other materials such as, for example, fibrillated cellulosic fluff, to form an absorbent structure. Such an absorbent structure can be utilized as a layer, a core, etc., of a SAP product. As an example, an SAP product can include one or more water penetrable layers and/or one or more water impenetrable layers. As an example, a water penetrable layer can be oriented in a direction of a water source where a water impenetrable layer may be oriented in a direction of a component, an environment, a space, etc., which is to be protected from exposure to water by the SAP product. In the personal hygiene-industry, a diaper is an example of a SAP product where one side can be oriented inwardly toward a source of urine (e.g., a liquid that is mostly water that can be considered to be a saline liquid) and the other side oriented outwardly such that the urine does not leak. Such a diaper can be fashioned as a garment with elastic that forms seals about a waist and legs, which can aim to prevent leakage outwardly.

As to a computing device, exposure to water can be from an exterior environment (e.g., an exterior space) to an interior environment (e.g., an interior space). Various components can be damaged upon exposure to water, where damage may occur via one or more mechanisms (e.g., conductivity, corrosion, swelling, freezing/thawing, etc.).

As an example, a computing device can include one or more water absorbent materials that can help to protect one or more components from exposure to water, which can be water that is in liquid form such that it flows. Humidity is another form of water that is a vapor form, often presented as a concentration of water vapor present in air. Humidity can be characterized as a gaseous state of water. Humidity can be characterized as relative humidity, which is a metric that finds use in weather forecasts and reports, as it is an indicator of the likelihood of precipitation, dew, or fog.

Various electronic components, devices, etc., can be rated to operate under specific humidity conditions (e.g., consider approximately 5 percent to approximately 95 percent). At the top end of a range, moisture may increase conductivity of permeable insulators leading to malfunction; whereas, at the low end of a range, too low humidity may make some materials brittle (e.g., subject to cracking, etc.). A particular detrimental condition for electronics is condensation. When an electronic component, device, etc., is moved from a cold place (e.g., garage, car, shed, an air conditioned space in the tropics, etc.) to a warm humid place (e.g., house, outside tropics, etc.), condensation may coat circuit boards and other insulators, leading to short circuiting. Short circuits may cause substantial, permanent damage where power is supplied before the condensation has evaporated. It can be advisable to allow electronic equipment to acclimatize for several hours after a change in environment that can promote condensation formation before powering on. Some electronic devices can include circuitry (e.g., humidity detection circuitry, moisture detection circuitry, etc.) that can detect such a change and indicate (e.g., a graphic such as a small droplet symbol) that they cannot be used until the risk from condensation has passed. In situations where time is a factor, increasing air flow through an interior space of a device (e.g., removing a panel, a cover, etc.) and directing a fan to blow into a housing may reduce time to acclimatize to the changed environment.

In some instances, a very low humidity level can favor build-up of static electricity, which may result in damage, spontaneous shutdown, etc., when a discharge or discharges occur. In addition to spurious erratic function, electrostatic discharges can cause dielectric breakdown in some solid state devices, which may result in irreversible damage. Various data centers, server farms, etc., tend to monitor relative humidity levels for such reasons.

As an example, a water absorbent material in a computing device can be configured to handle liquid water and gaseous water (e.g., water vapor). Such a material can be positioned in and/or on a computing device in one or more places such that water that flows to the computing device can be absorbed in a manner that can help to protect the computing device. In various examples, water that flows to a computing device can be utilized to cause a barrier to form that helps to prevent one or more components from exposure to water. For example, a material can upon contact with water expand to form one or more seals that can hinder transport of water to one or more components.

In various examples, a material that responds to water can change shape (e.g., bulk shape) in a manner that helps to protect one or more components, can absorb water in a manner that helps to protect one or more components, can repel water in a manner that helps to protect one or more components, etc.

In various examples, a material that responds to water can be a state-based material that can be present in one or more states. For example, consider a first state that may be considered a dry state and a second state that may be considered a wet state where the material transitions from the dry state to the wet state upon exposure to water in liquid state, which can be flowing water. In such an example, the water in the liquid state can be of a volume that is greater than approximately 1 milliliter (1 ml, which is one cubic centimeter).

As an example, a material can be rated according to a volume of water and/or a mass of water, which may be equated to a volume via density. For example, a material that expands in volume responsive to contact with water can expand from a first volume to a second volume where the second volume can perform a sealing function. Where the volume of water is insufficient to cause the material to achieve the second volume and hence the sealing function, that volume of water can be below the rated volume of water.

As to a rated volume of water, consider a notebook computer with a keyboard in a keyboard housing where the keyboard housing includes a system board along with various other electronic components. In such an example, a user may have a cup of coffee such as a "tall" sized cup of approximately 12 fluid ounces, which is approximately 355 ml; noting that the cup may be less than full yet include at least approximately 0.5 fluid ounces (e.g., approximately 15 ml). In such an example, consider a 15 ml spill onto the keyboard where some of that volume of liquid (e.g., mostly water) can flow past the keyboard and into the keyboard housing to contact the system board. In such an example, flow of one milliliter of the 15 ml can be sufficient, depending on what it contacts to cause a short circuit of one or more system board components.

In various examples, one or more materials may be included in a computing device that are rated with ratings sufficient to protect one or more components of the computing device from one milliliter of water or more. For example, consider a SAP filter media that is made from a sodium polyacrylate polymer that can be blended with cellulose filter media (e.g., cellulose fibers) and that can absorb 70 grams of water per gram of SAP filter media. Such a SAP filter media can be sized and shaped for positioning at or on a system board of a computing device where one side may optionally include a water impermeable layer (e.g., a water impermeable film, which may be a hydrophobic film, etc.). In such an example, the SAP filter media can expand and turn into a gel-like material with an increased mass and volume. The SAP filter media can "thicken" in a manner that makes it less permeable (e.g., an increase in pressure loss in terms of a filter). Thus, as the SAP filter media responds to exposure to water to become more of a water flow barrier, it can further protect the system board from exposure to water. In such an example, the amount of SAP filter media can be limited for purposes of protection and fully expanded volume, where the fully expanded volume can be limited such that pressure is less than a burst pressure, a deformation pressure, etc., of a housing of the computing device, a system board of the computing device, etc.

As an example, a SAP material such as a SAP filter media can be provided with a layer that can be a barrier layer to water. In such an example, the SAP filter media may be a modified filter media that is modified such that water cannot flow from one side to the other side across a thickness.

As an example, a layer of an SAP material can be an adhesive layer. For example, consider an adhesive layer that can be utilized to apply the SAP material directly onto an electronic component and/or another type of component (e.g., a housing, etc.). As an example, an adhesive layer can be permeable or impermeable and/or adjacent to a layer that is permeable or impermeable. As an example, an SAP material can be provided as an adhesive tape, an adhesive pad, etc., which can be adhered to one or more components of a computing device. As an example, an adhesive can be a water-proof adhesive such that the adhesive does not release upon exposure to water. As an example, SAP filter media can be utilized in a manner where it is sized and adhered via an adhesive to one or more components of a computing device where such an adhesive may be a layer as a film (e.g., double sided, etc.), a spray, etc. For example, consider a method that includes applying an adhesive to a component of a computing device and then adhering a SAP material, which may be a SAP filter media or other SAP material, to the component.

As an example, a SAP material can be, in a spent state, relatively resistant to flow of water such that it operates as a water barrier. Such barrier function may remain even in a spent, dry state of the material, which may be a viable or a non-viable spent, dry state. A viable spent, dry state of a material can be a state where the material retains at least approximately 5 percent of its original rating. For example, if a volume of material is rated to absorb 100 times its volume, in a viable spent, dry state, it may be rated to absorb 5 times its volume; noting that its structure may be altered in a somewhat irreversible manner such that permeability of the material may differ, which may differ beneficially (e.g., less penetrable) or detrimentally (e.g., more penetrable).

In various examples, an increase in volume that accompanies a material's response to liquid water can be utilized to cause one or more disconnects as to one or more conductors. For example, consider a plug in a socket where material such as, for example, SAP material, is positioned such that pressure generated by the SAP material upon exposure to liquid water is sufficient to cause separation of the plug from the socket to cause one or more disconnects, which can include, for example, electronic power disconnects, which may help to prevent detrimental short circuiting. As another example, consider a product that includes SAP material and a conductor, which may be a conductive film that breaks (e.g., separates) upon expansion of the SAP material.

As to a post-exposure state, a computing device can include a panel, a tab, etc., which may facilitate removal of a spent material after a water exposure episode. For example, consider a housing that includes a hatch that can be opened to access the spent material for removal and optionally for replacement thereof. In such an example, the spent material may be in a wet state (e.g., a gel state, etc.) or may be in a dry state, for example, where water has evaporated from the spent material. In various instances, where a material can return to a viable dry state, the material may be suitable for some amount of continued protection.

As an example, a computing device can be configured with a fan as an air mover where the fan can be actuated to operate in a drying mode, which may help to dry one or more types of materials, which can include a material in a wet state. For example, consider a computing device that includes a fan only power state where fan circuitry can cause operation of the fan to move air that can help to dry material to transition the material to a dry state, which may be a viable dry state or not.

As to a non-viable dry state, it can be, for example, a state that makes removal of the material unnecessary and/or that facilitates removal of the material. For example, consider a non-viable dry state where the material is innocuous to operation of a computing device. As another example, consider a non-viable dry state where the material is "broken" into smaller pieces, which can facilitate removal (e.g., via exposure to a vacuum, blowing air, etc.). As an example, a material can be a single-use material or can be a multi-use material where the multi-use material can transition from a wet state to a viable dry state.

As mentioned, a material can be zoned to include zoned gradients and/or strategic placements, which may include one or more different SAP materials with different performance properties.

As an example, a material (e.g., a product) can be provided as a sheet that can be zoned in a manner that strategically protects various components of a computing device from exposure to liquid water. For example, such a sheet can include one or more anchor points or anchor regions that may be of one type of zone and one or more other points, regions, etc., that may be of another type of zone. Such an approach can, for example, be zoned to provide for integrity of the material at the anchor points (e.g., less swelling, which may impact structural integrity of connection(s)) where anchor points may help to assure coverage and be zoned to provide for desired behavior as to protection of electronic components in other regions. In such an example, the sheet of material can be configured using factors as to protection and stress. For example, protection can aim to protect one or more electronic components from short circuiting water damage while stress can aim to protect one or more components from stress damage.

As to properties, a material (e.g., a product) can be characterized, for example, by one or more of basis weight, bulk density, loft, porosity, thickness, hydrophilicity, hydrophobicity, air permeability, water permeability, etc.

As an example, one or more materials, processes, products, etc., as described in an article by Whitmore, entitled "Nonwovens Containing Immobilized Superabsorbent Polymer Particles," INJ Fall 2003, pp. 35-40, which is incorporated by reference herein, may be utilized to make a product suitable for use in a computing device. The article by Whitmore describes data for diapers where 100 ml doses of 0.9 percent saline solution were delivered at 20 minute intervals to various diaper products. The article by Whitmore, in the context of personal hygiene products indicates that a nonwoven approach can provide a more homogeneous SAP distribution and can offer some opportunities for designing and manufacturing profiled absorbent articles with specific zones tailored to perform specific functions.

As an example, a product can be formed that includes an amount of a water absorbent material such as a superabsorbent material that is specified in percent by weight of the product. For example, consider a range of approximately 1 percent to approximately 99 percent where, for a spray deposition process of a monomer to be polymerized in-situ, a percent by weight greater than approximately 80 percent may be considered saturated with water absorbent material.

As an example, a product can be tailored to achieve a desirable swelling behavior. For example, degree and rate of expansion may be optimized by adjusting one or more production parameters such as, for example, degree of loading of water absorbent material (e.g., pre-polymerized, particles, etc.) on a substrate, particle size, the degree of neutralization of particles, crosslink density, etc. In various examples, degree of expansion can be an indication of generated pore volume available for fluid uptake. As an example, a product can be designed that involves increasing speed at which the pore volume is generated, which may diminish the likelihood of leakage during rapid fluid application.

A particular test may be performed to characterize a product such as, for example, a free swell expansion volume (FSEV) test that involves measuring the height (thickness) change, in millimeters, of a compressed, 6.0 cm diameter circle of the product during hydration using a single 20 ml dose of 0.9% saline under an applied load of 0.6 KPa (e.g., approximately 0.087 psi). Another test is referred to as expansion volume under load (EVUL). The article by Whitmore demonstrates that certain test samples can expand quite rapidly due to hydration even under an applied load of 3.0 KPa (e.g., approximately 0.435 psi or approximately 7 ounces per square inch).

As to some examples of changes in thickness for FSEV and EVUL, consider an initial height of 0.72 mm and a final height of 3.5 mm for FSEV and consider an initial height of 0.61 mm and a final height of 2.5 mm for EVUL.

As an example, a material can be made or provided that can respond dynamically in a desired manner (e.g., upon exposure to a volume of water, a volume of water at a particular volumetric rate, etc.). For example, a material can exhibit a swell time as it transitions from a dry state to a wet state where the swell time can be of the order of seconds. For example, a material may reach a maximum in terms of volume, height, and/or capacity of water in less than approximately three minutes where greater than approximately 33 percent of that volume, height, and/or capacity of water is achieved within less than approximately 60 seconds or, for example, less than approximately 30 seconds (e.g., depending on amount of water supplied with respect to maximum water capacity).

As an example, a computing device can include a water absorbent material that can be in the form of a product that can be in an initial state that is a dry state and that can transition to a use state that is a wet state upon exposure to water as a liquid. In such an example, the product can be of a thickness that is less than or equal to approximately 4 mm in an initial state that is a dry state and that can expand to a thickness that is form filling in a use state that is a wet state.

As to form filing, consider a housing that has a thickness of approximately 15 mm from a top surface to a bottom surface and where a 4 mm thick product can swell to increase its thickness by at least approximately four times to approximately 16 mm. In such an example, as the thickness of the housing is less than 16 mm, the product in the wet state can be form filling and may apply some amount of pressure to the top and/or bottom surface of the housing. As an example, in the wet state, the product can possess various mechanical properties, which can, for example, provide for anti-vibration, anti-mechanical shock, etc., types of protection. For example, in the wet state, the product may possess elasticity (e.g., viscoelasticity, elastic solid elasticity, etc.), which may help to damp energy (e.g., vibration, mechanical shock, etc.).

As an example, a housing can include a board such as a printed circuit board (PCB) with components mounted thereto. In such an example, a product may be placed to one side of the board and/or a product can be placed to another, opposing side of the board, which may be the same piece of product (e.g., consider a folded product, a pocket product, etc.). As the board may be approximately 2 mm thick and the housing approximately 14 mm thick, if the board is in the middle, a space of 6 mm can exist to a top side of the housing and a space of 6 mm can exist to a bottom side of the housing. In such an example, the product can be configured to expand to fill the 6 mm space between the board and a corresponding side of the housing. For example, consider a product with an initial thickness of approximately 2 mm that can expand to a thickness that is at least 3 times greater, to 6 mm. As explained, a product can be in a compressed state and still expand (see, e.g., FSEV and EVUL tests).

As an example, a housing, a shell, etc., of a computing device can include a layer of SAP material. For example, consider a keyboard housing of a notebook computing device that includes a layer of SAP material adhered to an inner surface. In such an example, the inner surface can be of a polymeric material, a metallic material, etc. For example, consider an a keyboard housing formed from an upper component and a lower component where at least one of the upper component and the lower component includes an inwardly facing surface with one or more pieces of SAP material adhered thereto.

As mentioned, a product can swell in a manner that acts to increase pressure on a connector such that a disconnect occurs, which can be an electrical disconnect that can help to prevent short circuiting or other electrical damage due to the presence of water as a liquid with sufficient ionic content.

As an example, an in-situ material can be formed that exhibits rapid swelling, which can generate a relatively large open pore volume, yet with a lack of sufficient capillary pressure, which may be desirable or undesirable in certain applications. For example, where it is desirable to effectively wick and distribute fluid, the lack of sufficient capillary pressure may be effectively overcome through formation of laminate structures with materials such as cellulosic materials. As an example, a product can be formed with in-situ water absorbent material in a substrate (e.g., fiber substrate, etc.) and cellulosic material for purposes fluid distribution (e.g., via wicking, etc.).

As an example, a material for use in a computing device can be manufactured using one or more techniques, which can include a powder-based technique, an in-situ technique, a hybrid technique of powder-based and in-situ, etc.

As an example, a material can be formed via application of a monomer that can be polymerized via one or more techniques where the material can be in the form of a sheet, which can be a substantially two-dimensional product, which may be formed as or cut into a strip, a gasket, etc. As an example, a three-dimensional product may be formed such as a ring with a particular cross-sectional shape, which may be a ring gasket, etc. Such products can provide for absorbing water as a liquid, which can flow thereto. As an example, a product can swell (e.g., increase in volume) to transition from one shape and/or size to another shape and/or size.

As an example, a product can be configured to compartmentalize. For example, consider a sheet with two zones of superabsorbent material separated by a zone without the superabsorbent material. In such an example, upon exposure to water, when the sheet is disposed within a housing of a computing device, the two zones may swell such that a compartment is formed or such that compartments form. For example, consider a compartment defined in part by the zone without the superabsorbent material, which may be a water permeable zone or a water impermeable zone that can handle water in liquid form in a desired manner, such as, for example, to cause the water to flow toward an outlet, etc. For example, upon swelling, a product or products may form one or more channels (e.g., paths, passages, etc.) that direct water in a particular direction or directions.

As to a deposition process for monomer onto a substrate, which may be a nonwoven or other type of substrate, such a process can deposit the monomer in a pattern or patterns. For example, consider a method that includes positioning a keyboard housing with a keyboard over a material and spilling water onto an upper surface of the keyboard where the water can flow through various openings toward a lower surface of the keyboard such that a water pattern can be determined or, for example, consider use of a camera or cameras to identify how and/or where water flows. In such examples, a pattern or patterns can be determined that can be utilized for purposes of making a product or products that include water absorbent material, which may be polymerized in-situ after deposition of monomer. For example, consider programming a sprayer (e.g., a robotic spray head, etc.) such that the sprayer can deposit monomer onto a substrate in a pattern that is based at least in part on a "spill" pattern of a computing device. In such an example, a product can be formed that is water absorbent with regions (e.g., zones, etc.) that are customized to that computing device. For example, where a leak is noted at a position referenced with respect to a computing device (e.g., a keyboard housing, etc.), a sprayer can deposit monomer at that leak position onto a substrate where the monomer can be polymerized to form a product that provides for water absorbency at that leak position. In such an example, the product can swell at that leak position, which may act to seal off a leak (e.g., seal off an opening). As another example, a leak position of a spill pattern may be utilized for forming one or more channels. For example, the product may include adjacent zones that swell to leave a channel that is substantially isolated within a housing and that may have an outlet or outlets, which may be at a bottom side, a lateral side, etc., of the housing.

As explained, a product can be formed that provides for water management in a computing device exposed to water as a liquid. Such a product can swell via use of water absorbent material for one or more purposes such as, for example, one or more of directly isolating water with the water absorbent material through absorbing the water, channeling the water via formation of one or more water channels (e.g., and/or reservoirs, etc.), and sealing, which may act to hinder flow of water to and/or form one or more spaces within a housing of a computing device.

As an example, a material can transition from a dry state to a wet state where, in the wet state, shock absorbing properties of the material can be greater than in the dry state. For example, in the wet state, the material can have elastic properties that are protective as to mechanical shock. In such an example, a computing device can be water protected and mechanical shock protected. For example, a computing device that is subjected to an accidental spill may also fall due to action of a person, a thing, gravity, etc. For example, where a computing device is on a sloped surface and subjected to a spill, friction between the computing device (e.g., feet thereof) and the sloped surface may less such that the computing device slides, which may then hit an object, which can be a floor where the computing device slides off the sloped surface and onto the floor. Acceleration of the computing device can be due at least in part to gravity; noting that a user that tries to grab the device prior to falling, hitting another object, etc., may unintentionally add further energy to the device, which can place the device at greater risk of damage due to mechanical shock.

As an example, for polymer materials, damping of energy can be a consequence of viscoelasticity (e.g., behavior associated with viscous liquids, gels, elastomeric solids, etc.). In viscous liquids, rate of deformation tends to be proportional to applied stress while, in elastomeric solids, deformation tends to be proportional to applied stress. In a material, work can be converted to heat by viscous action and/or stored as potential energy. The interaction of viscoelastic materials with an applied sinusoidal strain may be described in terms of a storage modulus $G'$, which can be in-phase with applied strain, and a loss modulus $G''$ which can be 90 degrees out of phase. A loss factor or damping term, tan $\delta$, may be defined as a characteristic, which may be regarded as a measure of damping ability inherent in a material. For effective damping, a polymeric material may have a loss factor of at least approximately 0.05. As an example, a gel that includes superabsorbent polymer and water can possess a loss factor that is suitable for use as a shock damping element (e.g., at ambient temperature).

As an example, a material (e.g., a product) can be formulated such that in a wet state it possesses desirable damping characteristics. Such a material can be a gel in the wet state with appropriate character to protect one or more components from mechanical shock. As explained, viscoelasticity may be utilized to characterize a gel, along with how "solid" the gel becomes. As an example, a gel can be damping due to one or more viscous mechanisms and/or due to one or more elastic mechanisms. As mentioned, for viscous liquids, work can be converted to heat while for elastomeric solids, work can be stored as potential energy; and, in viscous liquids, rate of deformation tends to be proportional to applied stress while, in elastomeric solids, deformation tends to be proportional to applied stress. As an example, a material can be formulated with a targeted percent by weight of solids where a greater percent can result in a more solid-like gel. For example, a weight percent of approximately 0.5 to approximately 7.5 of a superabsorbent polymer with approximately 99.5 to approximately 92.5 weight percent water can provide a gel that has viscoelastic character, which may be damping as to certain types of vibration; whereas, for example, higher weight percent of superabsorbent polymer and lower weight percent of water can provide for a gel that has, relatively, more solid character such as that of an elastic solid. In the aforementioned article by Whitmore, weight percent of SAP can be greater than approximately 7.5, as a water insoluble, water swellable gel can be formed with approximately 25 percent by weight or more of solids. As an example, a material can be formed that provides for desired mechanical characteristics upon exposure to liquid water.

As to utilization of material in a device as a shock absorber in a wet state, such an approach can be beneficial as the mass of the device can be increased due to water being absorbed by the material. As mentioned, where a device falls under gravity (g), the force can be estimated using the equation F=mg, where the greater the mass (m) the greater the force (F). Mass of a device may be given in a dry state and in a wet state where mass in a wet state may be determined at least in part via consideration of one or more water absorbing materials in the device.

U.S. Pat. No. 5,472,761, entitled "Vibration damping superabsorbent composites", issued 5 Dec. 1995, is incorporated by reference herein ('761 patent). The '761 patent describes some superabsorbent polymers useful as a gel component that are made from: (a) at least one monomer which have a polymerizable double bond which is water soluble or may be made water soluble by hydrolysis; (b) a crosslinking agent; and optionally (c) a polysaccharide selected from the group consisting of starches and cellulose. The '761 patent states that water soluble monomers with a polymerizable double bond and a hydrophilic radical can be used to make such polymers include carboxylic compounds such as acrylic acid, methacrylic acid, maleic acid, fumaric acid, maleic anhydride; as well as sulfonic acid compounds such as vinyl sulfonic acid, allylsulfonic acid, vinyltoluenesulfonic acid, styrenesulfonic acid, methacrylic sulfonic acids, sulfopropyl methacrylate; salts of the foregoing monomers; hydroxyl containing monomers such as alkylene glycols; and finally suitable amides and amines. The '761 patent also notes that some crosslinking agents useful to make superabsorbent polymers include polyvinyl compounds such as divinylbenzene, divinyltoluene, divinylxylene, or the like; and that natural or modified starch or cellulose may be included in a superabsorbent composition.

As explained, a computing device can include one or more materials that respond to exposure to liquid water by automatically acting for one or more purposes. Such purposes can include, for example, protection from water damage (e.g., water protection) and/or, for example, protection from mechanical shock.

Figure 3:
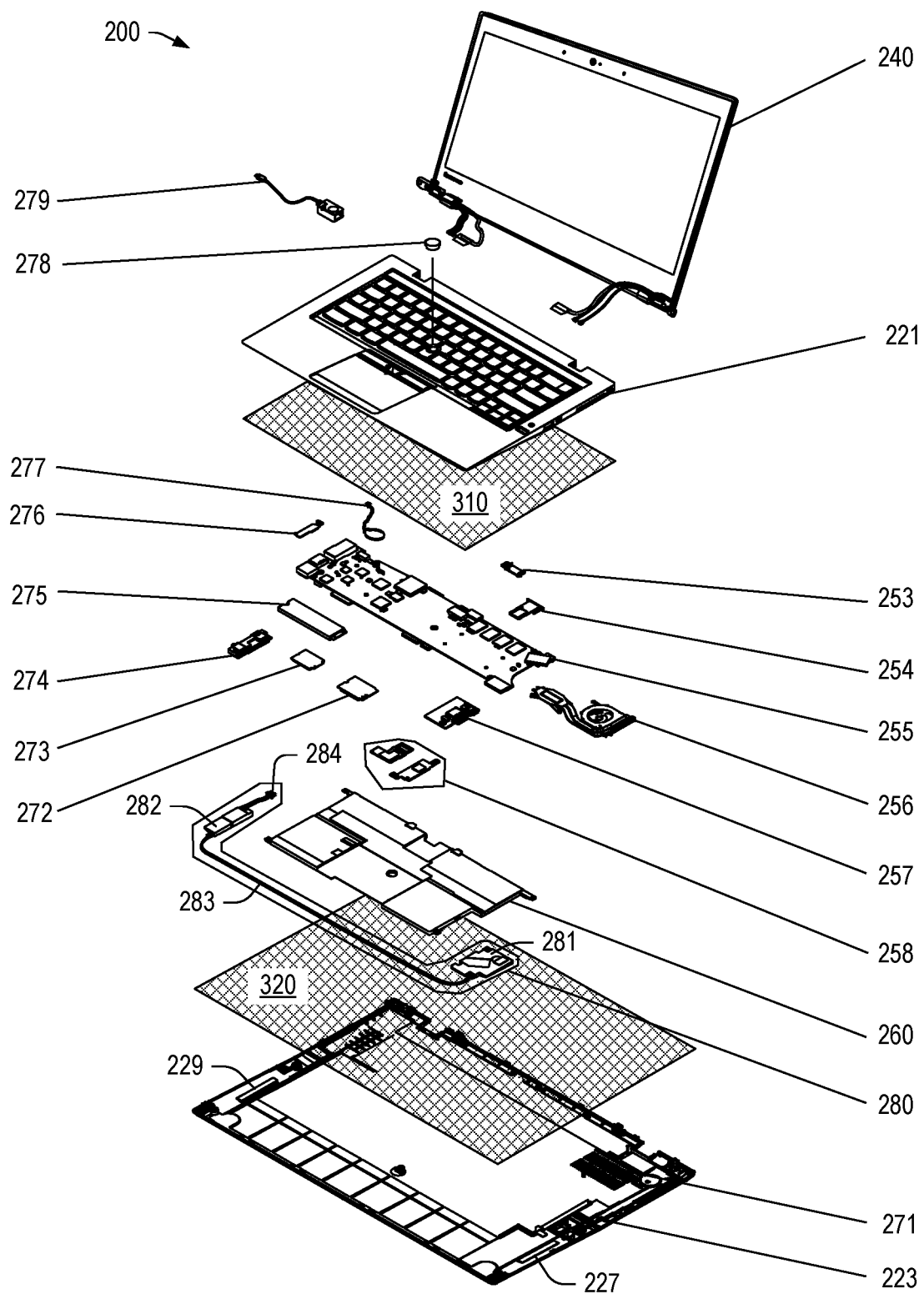
FIG. 3 is a diagram of an example of the device of FIG. 2.

FIG. 3 shows an exploded view of the device 200 of FIG. 2, which shows the display housing 240, an upper assembly of the keyboard housing 221 and a lower assembly of the keyboard housing 223 where the upper assembly of the keyboard housing 221 and the lower assembly of the keyboard housing 223 can be joined to form the keyboard housing 220. As shown, the lower assembly of the keyboard housing 223 can include one or more vents 271, which can provide for cooling, etc. As shown, the upper assembly of the keyboard housing 221 includes a keyboard as a human input device. As an example, the lower assembly of the keyboard housing 223 can be a base cover assembly that covers the upper assembly of the keyboard housing 221; noting that various components may be mechanically coupled to the upper assembly of the keyboard housing 221 where, for example, screws, bolts, etc., may be positioned in through bores and/or bosses of the lower assembly of the keyboard housing 223 to thread into bores and/or bosses of the upper assembly of the keyboard housing 221. As an example, during servicing, the lower assembly of the keyboard housing 221 may be removed via unscrewing of screws, bolts, etc., to access various components of the keyboard housing 220.

As an example, a laptop computer (e.g., notebook computer) can include a display housing that is an assembly that includes one or more covers or shells and can include a keyboard housing that is an assembly that includes one or more covers or shells. For example, a display housing can include an A-cover and a B-cover that mate where the A-cover forms a back side of the display housing and where the B-cover forms a bezel on a front side or display side of the display housing about a display (e.g., a display surface) and, for example, a keyboard housing can include a C-cover and a D-cover that mate where the C-cover forms a front side or a keyboard side of the keyboard housing and where the D-cover forms a back side, bottom side or base side of the keyboard housing. In the example of FIG. 3, the lower assembly of the keyboard housing 223 can be a D-cover assembly that covers the upper assembly of the keyboard housing 221, which can be a C-cover assembly. In such an example, the D-cover assembly and the C-cover assembly can each include a shell such as, for example, a D-cover shell and a C-cover shell. As an example, a tablet can include a top shell that may be or include a bezel (e.g., a display bezel) and a bottom shell. As an example, a display may be a top shell, for example, consider a display that can be attached to a bottom shell to form a housing of a device (e.g., consider a tablet device, a smart phone device, etc.).

As an example, a shell can be a part that is formed by one or more processes such as, for example, molding (e.g., injection molding), 3D printing (e.g., additive manufacturing, etc.), stamping (e.g., metallic sheet stamping), etc. As an example, a shell can include an injection molded part and a stamped part where, for example, the injection molded part is an insert for the stamped part or vice versa.

Various examples of components are shown in FIG. 3, including a SIM card tray bracket 253, a SIM card tray 254, a system board assembly 255 (e.g., a motherboard), a fan 256, an RJ45 card with a USB connector 257, a fingerprint reader assembly 258, a lithium ion battery 260, a speaker assembly 280, a wireless WAN card 272, a wireless LAN card 273, an audio card with a USB connector 274 (e.g., audio circuitry), a M.2 solid-state drive 275 (SSD), a DC-in bracket 276 (e.g., for DC power), a coin-cell battery (e.g., for back-up power) 277, a trackpoint cap 278 for a trackpoint human input device (HID), and an Ethernet extension adapter 279. In the example of FIG. 3, the fan 256 can be positioned adjacent to the one or more vents 271 of the lower assembly of the keyboard housing 223 such that air may be drawn in and/or exhausted from a space defined by and between the upper assembly of the keyboard housing 221 and the lower assembly of the keyboard housing 223.

In the example of FIG. 3, the speaker assembly 280 includes a first sub-enclosure 281 for a first speaker driver, a second sub-enclosure 282 for a second speaker driver, a cable 283 and a connector 284. In the example of FIG. 3, the lower assembly of the keyboard housing 223 includes a first speaker opening 227 (e.g., a first speaker vent) and a second speaker opening 229 (e.g., a second speaker vent). In the example of FIG. 3, the first and second speaker drivers of the first and second sub-enclosures 281 and 282 are directed in a direction toward the first and second speaker openings 227 and 229, respectively. In such an arrangement, sound produced emanates from the first and second speaker openings 227 and 229 toward a support surface such as a desktop, a tabletop, a countertop, etc., when the device 200 is supported on such a support surface. Such on-board speakers do not face a user; rather, they may be characterized as facing away from a user (e.g., where the user's hands are positioned with respect to the keyboard 224 of the keyboard housing 220). As an example, a device can include one or more speakers that face toward a user, which may include one or more vents of a surface that faces upwardly, which may be amenable to receipt of water as a liquid (e.g., due to a spill, etc.).

In the example of FIG. 3, one or more products can be included in the space defined by and between the upper assembly of the keyboard housing 221 and the lower assembly of the keyboard housing 223. Such a space can be referred to as an interior space, where, external to the keyboard housing 220, there exists an external space. As explained, water can flow from the external space to the internal space via one or more openings, which can include, for example, one or more of the vents 271, 227 and 229; noting that other openings can exist such as in the upper assembly of the keyboard housing 221, etc.

FIG. 3 shows an example of a first product 310 and an example of a second product 320 where the first product 310 is positioned at least in part between the system board 255 and a lower surface of the upper assembly of the keyboard housing 221 (e.g., an inwardly facing surface) and where the second product 320 is positioned at least in part between the system board 255 and an upper surface of the lower assembly of the keyboard housing 223 (e.g., an inwardly facing surface). In such an example, the system board 255 can be described as being "sandwiched" between the two products 310 and 320 (e.g., optionally with direct contact). In such an example, the product 310 can protect against flow of water from one or more openings that may be in the upper assembly of the keyboard housing 221 and the product 320 can protect against flow of water from one or more openings that may be in the lower assembly of the keyboard housing 223; noting that protection can be for one or more openings formed at one or more junctures (e.g., joints, etc.) between the upper assembly 221 and the lower assembly 223. As mentioned, a product can be adhered to an inwardly facing surface (e.g., or inwardly facing surfaces) such as, for example, an inwardly facing surface of the upper assembly 221 and/or the lower assembly 223.

In the example of FIG. 3, the product 320 can be air permeable and/or cut to provide for air flow at the one or more vents 271, 227 and 229. For example, the product 320 can be tailored to be adjacent to openings whereby upon exposure to water, the product 320 may expand to seal the openings (e.g., to close off a fan vent, to close off a speaker vent, etc.). As an example, upon exposure to water, the product 320 can transition from being air permeable to being substantially air impermeable. As explained, a SAP filter media can increase in pressure drop as it absorbs water. As an example, the product 310 and/or the product 320 can increase in pressure required to "push" water through the product 310 and/or the product 320 as water is absorbed. In such examples, exposure to water can form barriers that hinder further intrusion of water into the product 310 and/or the product 320 in a manner that can protect one or more components within the keyboard housing 220 (e.g., the system board 255, the SSD 275, etc.).

In the example of FIG. 3, the products 310 and 320 can be zoned. For example, consider zoning according to one or more spill patterns. As mentioned, a method can include spilling water (e.g., or other liquid) onto a keyboard to determine a leakage pattern. In such an example, the leakage pattern can be utilized to zone a product as to its behavior upon exposure to water. In the example of FIG. 3, the product 310 can include a zone that is of an area that corresponds to the system board 255 such that water flowing toward the system board 255 via a leakage point or leakage points is absorbed to protect the system board 255 from contact with liquid water (e.g., an amount of liquid water that would likely damage the system board 255).

In the example of FIG. 3, various connectors are shown, which can be subjected to water-disconnect, for example, via swelling of a water absorbent material. For example, consider one or more of the connectors of the system board 255 being configured for water-disconnect through use of one or more water absorbent materials. In such an example, a power connector can be configured to disconnect when exposed to water through action of a water absorbent material that can swell to increase pressure and/or volume in a manner that causes a disconnect of the power connector. In a disconnected state of the power connector, the system board 255 can be at least in part protected from flow of current from the power connector.

As an example, a material may act to disconnect a battery connector and/or a material may act to disconnect a power connector that couples to an external source of power (e.g., a power outlet). In such examples, various components of a device can be electrically disconnected (e.g., powered off) through action of one or more materials that act responsive to exposure to water as a liquid.

As an example, a water absorbent material can include one or more electrical insulators. For example, consider a water absorbent material that includes a surface that can be water permeable such that it can absorb water and another surface that may be water impermeable and an electrical insulator. For example, consider a rubber layer (e.g., synthetic, natural, etc.) that be positioned adjacent to a connector (e.g., or connectors) to help avoid electrical current flow after a disconnect.

In the example of FIG. 3, the products 310 and 320 can include one or more adhesives in one or more regions. For example, consider adhesive that can cause the product 310 and the product 320 to adhere to each other. In such an example, the adhesive and/or regions of adhesion can be water-proof, which may act to compartmentalize the products 310 and 320. For example, upon exposure to water, the products 310 and 320 can include one or more water-proof interfaces therebetween that may act to form compartments that can include one or more dry compartments and/or one or more wet compartments. As mentioned, a product or products in a computing device can be utilized for water management, which can provide for managing water by controlling how and/or where water can and/or cannot flow in the computing device, for example, dynamically in response to the presence of liquid water. As mentioned, a product can perform an action, which can be an automatic response of the product upon exposure to liquid water.

Figure 4:
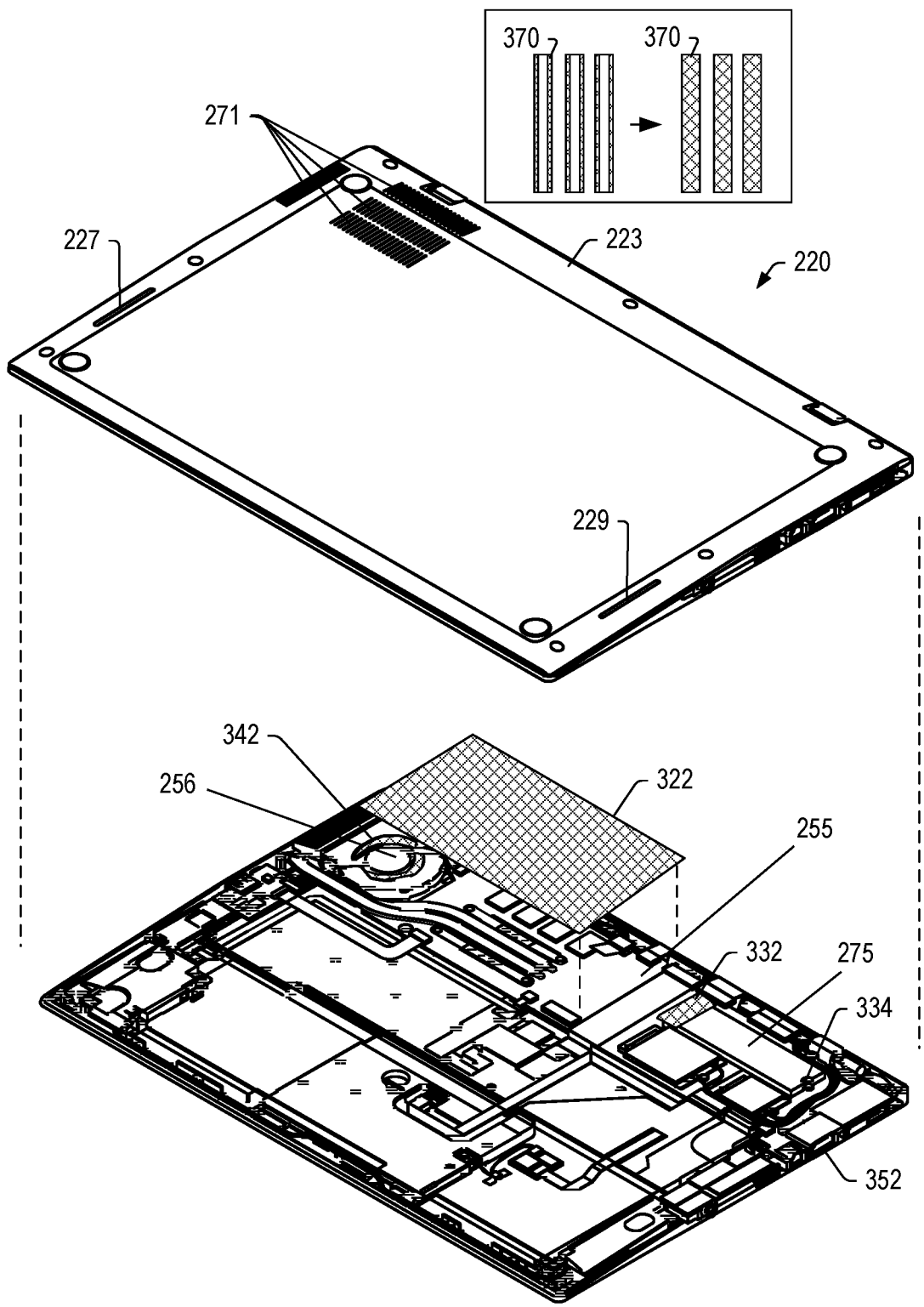
FIG. 4 is a diagram of the example of the device of FIG. 2.

FIG. 4 shows an exploded view of the keyboard housing 220 where various products 332, 332, 342, 352, and 370 may be utilized. FIG. 4 also shows the fan 256 with assorted fluid passages that can be utilized for movement of air to transfer heat energy.

As to the product 322, it can be configured to protect the system board 255, where a lower side of the system board 255 is visible along with various components attached thereto and various passages associated with the fan 256. As to the product 342, it can be positioned proximate to openings of the fan 256 where, upon exposure to water, the openings of the fan 256 become sealed (e.g., via swelling of the product 342, which can increase volume thereof to fill the openings of the fan 256.

As to the product 332, it can be configured to protect the SSD 275. For example, the product 332 can be a tape that includes adhesive and water absorbent material that can be absorbed, which can transition the product 332 to a more impenetrable state as to water. As mentioned, a tape can include a water impermeable layer, which may be a layer that is in contact with the SSD 275 and/or a socket (e.g., a M.2 specification socket, etc.). As an example, the product 332 can be a disconnect product that upon exposure to water causes a disconnect of the SSD 275 from its socket to protect the SSD 275 from water-related current flow damage. As shown, the SSD 275 can be mounted using a specialized connector 334, which may lose integrity upon exposure to water. For example, a screw (e.g., a bolt, etc.) can be utilized that includes a water absorbent portion (e.g., a cellulosic portion, a dissolvable ceramic portion, etc.) that has a first stiffness in a dry state and a second stiffness in a wet state where the second stiffness is less than the first stiffness. In such an example, where the product 332 responds to water by applying pressure on the SSD 275, the screw can yield under the applied pressure such that the SSD 275 can translate away from its electrical socket (e.g., M.2 specification socket, etc.) to disconnect from its electrical socket. In such an example, the electrical connectors of the SSD 275 may remain in a protected state by the product 332, which may include one or more insulators such as an insulating portion that can expand to fill at least a portion of a gap that is between the electrical connectors of the SSD 275 and the socket. In such an example, the insulating portion can act as a barrier that can help prevent flow of current from the socket to the electrical connectors of the SSD 275.

As to the product 352, it can be or include a gasket that expands to fill an opening of a connector such as, for example, an HDMI connector, a USB connector, a RJ45 connector, etc. In such an example, the product 352 can form a barrier that may be an electrically insulating barrier between conductors of the connector and an exterior environment where the barrier can also be water impermeable (e.g., due to expansion in volume and pressure).

As to the product 370, it is shown with respect to openings where it may form walls, peripheries, etc., of one or more openings. In such an example, upon exposure to liquid water, the product 370 can include a water absorbent material that expands such that the one or more openings are filled such that a water barrier is formed. As an example, the product 370 may be utilized for one or more of the vents 271, 227 and 229. In such an approach, water rising upwardly from the bottom of a computing device can contact such product or products to cause one or more water barriers to form. As mentioned, a sheet can be utilized where slits may be made in the sheet that are sufficient for purposes of air flow where the slits close automatically in response to the sheet being exposed to liquid water at the slits (e.g., or a region proximate thereto, etc.).

Figure 5:
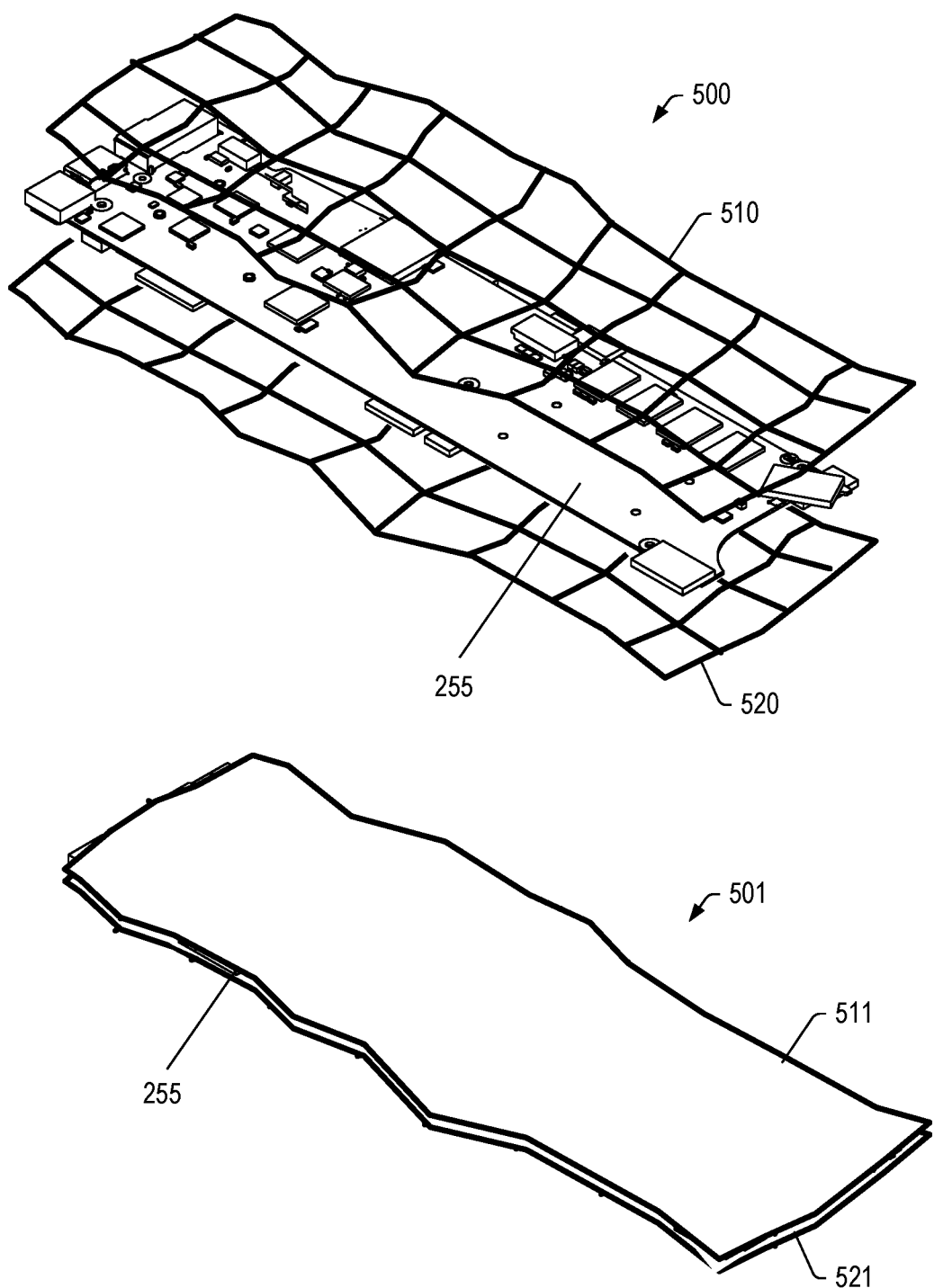
FIG. 5 is a diagram of an example of an assembly.

FIG. 5 shows an example of an assembly in a dry state 500 and the assembly in a wet state 501. In the dry state 500, membranes 510 and 520 can be positioned above and below the system board 255 where the membranes 510 and 520 can be products or a product (e.g., part of a contiguous membrane, etc.). In the example of FIG. 5, the membranes 510 and 520 can include superabsorbent material that responds to liquid water by rapid swelling such that openings in the membranes 510 and 520 become closed. In the example of FIG. 5, example openings are illustrated, which may be sized accordingly to provide for air flow and heat transfer in the dry state 500 and water protection in the wet state 501. For example, the openings can be smaller than those illustrated in FIG. 5. In the example of FIG. 5, the membranes 510 and 520 can be permeable to air in the dry state 500 and at least substantially impermeable to water in the wet state 501, which may be via swelling whereby the pressure required to drive water across either of the membranes 510 and 520 is sufficiently high to hinder passage of water therethrough. For example, as mentioned with respect to the SAP filter media, upon swelling, pressure loss increases. Where a driving force sufficient to overcome that pressure loss is not present, the swollen media can be a water barrier to flow of water therethrough.

As an example, the membranes 510 and 520 can be in contact at one or more points, for example, about a perimeter of the system board 255. In such an example, one or more adhesives may be utilized to provide for contact where such one or more adhesives can include a water-proof adhesive such that contact is not lost in transitioning from the dry state 500 to the wet state 501.

Figure 6:
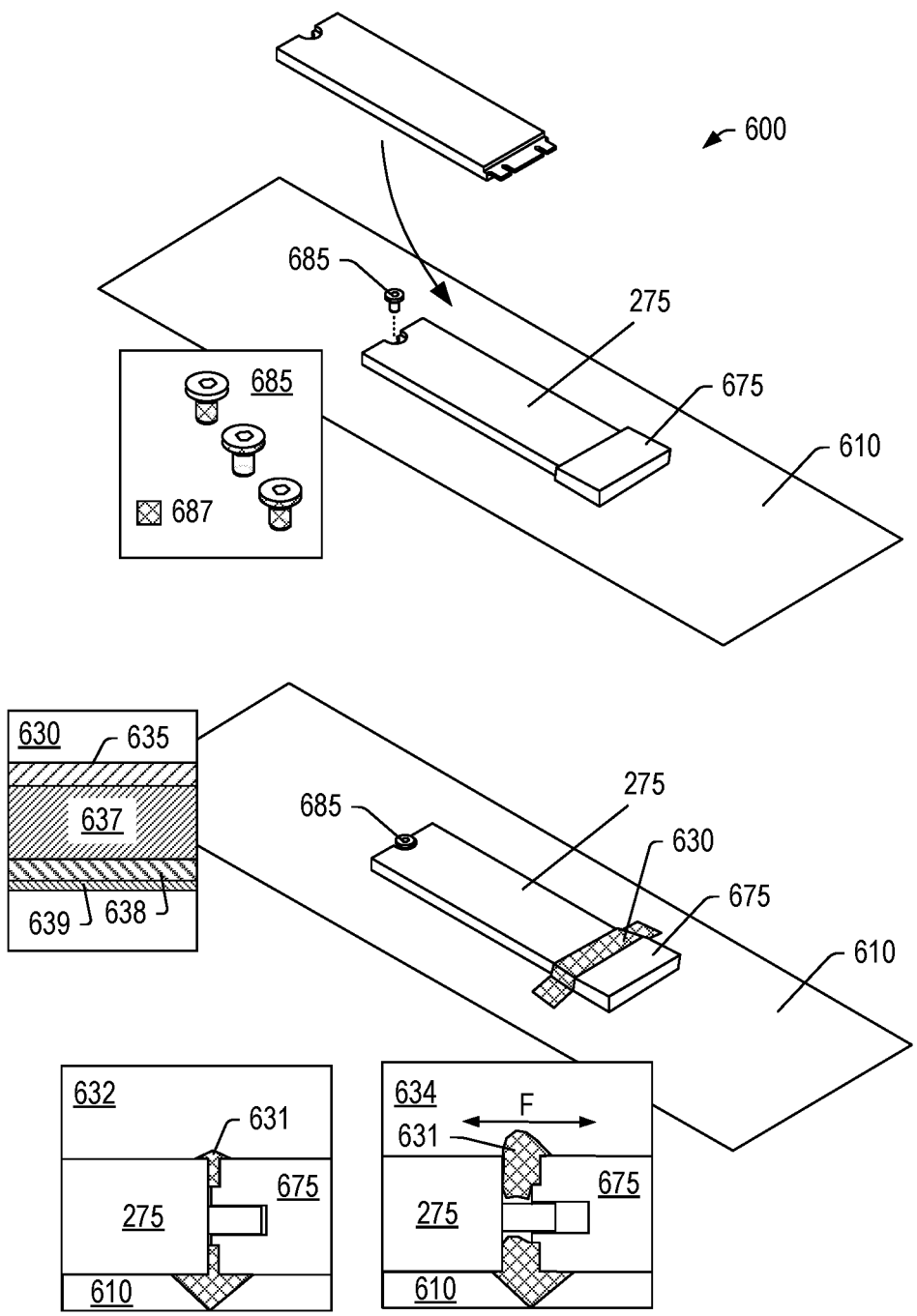
FIG. 6 is a series of diagrams of examples of an assembly and examples of components.

FIG. 6 shows an example of an assembly 600 that includes the SSD 275 as can be fit to a socket 675 supported on a board 610 such as a printed circuit board (PCB). As shown, a screw 685 (e.g., a bolt) can be optionally utilized to secure the SSD 275 to the board 610 with electrically conductive contacts of an edge of the SSD 275 received in the socket 675 (e.g., a M.2 specification socket, etc.). As shown, one or more products 630, 631, 685, etc., can be utilized to protect the SSD 275 and/or the socket 675 from water damage. As to the SSD 275, it can include data that is valuable to a user, a client of the user, an employer of the user, etc. In FIG. 6, various mechanisms can act responsive to exposure to water as a liquid to protect data of the SSD 275. While a single SSD is shown, a device can include multiple SSD and/or one or more other types of drives (e.g., data storage devices), which can include corresponding connectors (e.g., sockets, plugs, etc.).

As mentioned, a screw (e.g., a bolt) can be made of a water-sensitive material that causes the screw to weaken upon exposure to water. In such an example, where a product responds to water to cause separation of a component from a socket (e.g., from a connected state to a disconnected state), where the component (e.g., or the socket) is secured via a water-sensitive screw, the screw may give way (e.g., deform, break, etc.) such that the component (e.g., or the socket) can move to a disconnected state. While the foregoing example mentions a screw, another type of securing mechanism may include a water-sensitive feature. For example, consider a pin (e.g., a peg, etc.) that is water sensitive where the pin is received in a hole of a board (e.g., a PCB) to secure a component to the board. In such an example, upon exposure of the pin to water, the pin may give way such that the component is subjected to pressure from swelling of a water absorbent material such that the component can move responsive to the pressure, which may result in an electrical disconnect of the component.

In FIG. 6, the screw 685, which can be a product, is shown as including material 687 that responds to water to weaken the screw 685 by transitioning from a dry state to a wet state. As an example, the material 687 can be included as at least part of a shaft of the screw 685, at least part of a head of the screw 685 or as at least part of a shaft and at least part of a head of the screw 685. Where a head weakens, the SSD 275 may be movable upwardly away from the board 610 and where a shaft weakens the SSD 275 may be movable upwardly and/or outwardly with respect to the socket 675.

In FIG. 6, the product 630 can be a tape that can include adhesive for adhering the product 630 to one or more components such as the SSD 275 and/or the socket 675. In such an example, the tape can include a water proof (e.g., water impermeable) layer that is adjacent to a joint formed by the SSD 275 and the socket 675 where another layer includes water absorbent material such as a SAP material. In such an example, as water contacts the product 630, the layer with water absorbent material can "mop-up" (e.g., lock up, immobilize, etc.) the water while the water impermeable layer protects the joint from water intrusion. In such an example, an adhesive can be water proof such that exposure to water does not weaken the adhesive.

In FIG. 6, an approximate cross-sectional view of an example of the product 630 is shown with various layers 635, 637, 638 and 639. As shown, the layers can be of different thickness and may be of different materials. As an example, the layers can include a cover layer 635 and a barrier layer 638 and an absorbent layer 637 arranged between the cover layer 635 and the barrier layer 638. In the example of FIG. 6, the layer 639 may be an adhesive layer. The thickness of the product 630 in a dry state can be less than approximately 5 mm and may be less than or equal to approximately 3 mm. As an example, the product 630 can include a fluid-permeable cover layer 635, an absorbent system layer 637 and a fluid-impervious barrier layer 638 (e.g., a water impermeable barrier layer) where the absorbent system layer 637 can be a single layer of material or may include multiple layers of material. For example, the absorbent system layer 637 may include a single layer core or it may include a transfer layer and a core.

U.S. Pat. No. 7,811,270, to Rosenfeld et al., 12 Oct. 2010, entitled "Disposable absorbent sanitary napkin with modified circular bending stiffness and absorbency index values for improved drapeability" is incorporated by reference herein ('270 patent). One or more of the materials described in the '270 patent may be utilized in a product. For example, the product 310, the product 320, the product 322, the product 332, the product 342, the product 370, the product 510, the product 520, the product 630, the product 631, etc., may utilize one or more of the materials described in the '270 patent, optionally layered at least in part as one or more of the layers described in the '270 patent.

In FIG. 6, approximate cross-sectional views are shown for the SSD 275, the socket 675 and the board 610 where a product 631 can be disposed at least in part in a joint region of a joint formed by the SSD 275 and the socket 675. As shown, the product 631 can be in a dry state 632 and can expand upon exposure to water to transition to a wet state 634 that can be a swollen state. As shown, the transition due to exposure to water can cause force to be applied by the product 631 at the joint to force the SSD 275 and the socket 675 apart, which can electronically decouple the SSD 275 from the socket 675. As an example, the product 631 can be provided with a layer that can be water impermeable and electrically insulating and a layer that can be water permeable. For example, an outer layer can be water permeable to receive water such that the product 631 transitions from the dry state 632 to the wet state 634 where an inner layer that faces electrical contacts can be water impermeable to hinder intrusion of water, where such water may be conductive (e.g., of sufficient ionic concentration) that could, if present, provide an undesirable path for flow of current (e.g., between the socket 675 and the SSD 275).

As shown in FIG. 6, the board 610 can include a material that responds to exposure to water to help protect one or more electronic components from damage. For example, the board 610 can include a groove that can receive an amount of material where the groove may be at a juncture between two components (e.g., the SSD 275 and the socket 675). In such an example, the material can be exposed to water (e.g., via exposed ends, etc.) and swell to apply pressure to one or more components in a manner that can result in an electrical disconnect between electrical contacts of the two components. As an example, a material disposed in a board or otherwise between a component and a board may expand in a manner that causes the component to lift-up. As mentioned, where a screw is utilized to secure a component, if the screw is water-sensitive, it may weaken upon exposure to water. Where a screw weakens and a material expands responsive to water, the water caused actions of the screw and the material may act in harmony to protect one or more components. For example, where the screw 685 deforms that SSD 275 can move responsive to swelling of the product 631, which can help to electronically disconnect the SSD 275 from the socket 675.

As an example, where a printed circuit board (PCB) includes a groove that includes water swellable material, upon exposure to water, the water swellable material can swell in a manner that causes disconnection of one or more circuits of the PCB. For example, in FIG. 6, the material 631 may be in a groove that is V-shaped or otherwise shaped to cause force to be applied to the board 610, which upon exposure to water, can result in a separation (e.g., a disconnect) of a printed conductor. In such an example, where the conductor is a power supply conductor for supplying power to a component mounted to the board 610, the swelling can result in an electrical power disconnect of the component.

As an example, a product can be shaped as a gasket (e.g., a ring, etc.) with an outer layer that can receive water (e.g., water permeable) and an inner layer that is impermeable to water where, upon expansion of the material responsive to exposure to water, the material may form an inner chamber that may be a dry chamber (e.g., water free chamber) where electrical contacts are protected from exposure to water. As mentioned, an inner layer may be an electrical insulator such as, for example, a sufficiently non-conductive material (e.g., consider a rubber, which may be natural and/or synthetic). In various examples, one or more layers can be formed of elastic material such that a layer can change shape. For example, in FIG. 6, in the wet state 634, the product 631 is expanded and deformed where an inner layer can be made of an elastic material that can be, for example, electrically insulating and impermeable to water.

As mentioned, a material can be an elastomer (e.g., an elastomeric polymeric material). As an example, a material can include polyisoprene as an elastomeric polymer. As an example, a material can include one or more types of synthetic rubbers (e.g., styrene-butadiene rubbers (SBR) derived from the copolymerization of styrene and 1,3-butadiene, synthetic rubbers prepared from isoprene (2-methyl-1,3-butadiene, yielding polyisoprene), chloroprene (2-chloro-1,3-butadiene), and isobutylene (methylpropene) with a small percentage of isoprene for cross-linking (butyl rubber), etc.). As an example, a material can include a silicone rubber (e.g., a silicone elastomer), which may include polydimethylsiloxane, for example, as derived by hydrolysis of dimethyldichlorosilane. As an example, a silicone elastomer can be utilized as part of a product. As an example, a silicone elastomer can be immersed in water (e.g., cold water, warm water, or boiling water) for long periods with water absorption of about one percent, and with little effect on mechanical strength or electrical properties (e.g., consider relatively high insulation resistance of approximately 1 TΩ·m to approximately 100 TΩ·m; noting that an amount of carbon can be included in a silicone elastomer to provide for electrical conductivity, i.e., reduced electrical resistance). As an example, a silicon elastomer can be tailored with respect to permeability to water via selection of R groups, filler type, filler loading levels, etc. For example, a hydrophilic group, a hydrophilic filler, etc., may be utilized to decrease permeability to water. As an example, a silicone elastomer can be utilized with a layer that is impermeable to water and that may be of sufficient electrical resistance to be an electrical insulator.

Figure 7:
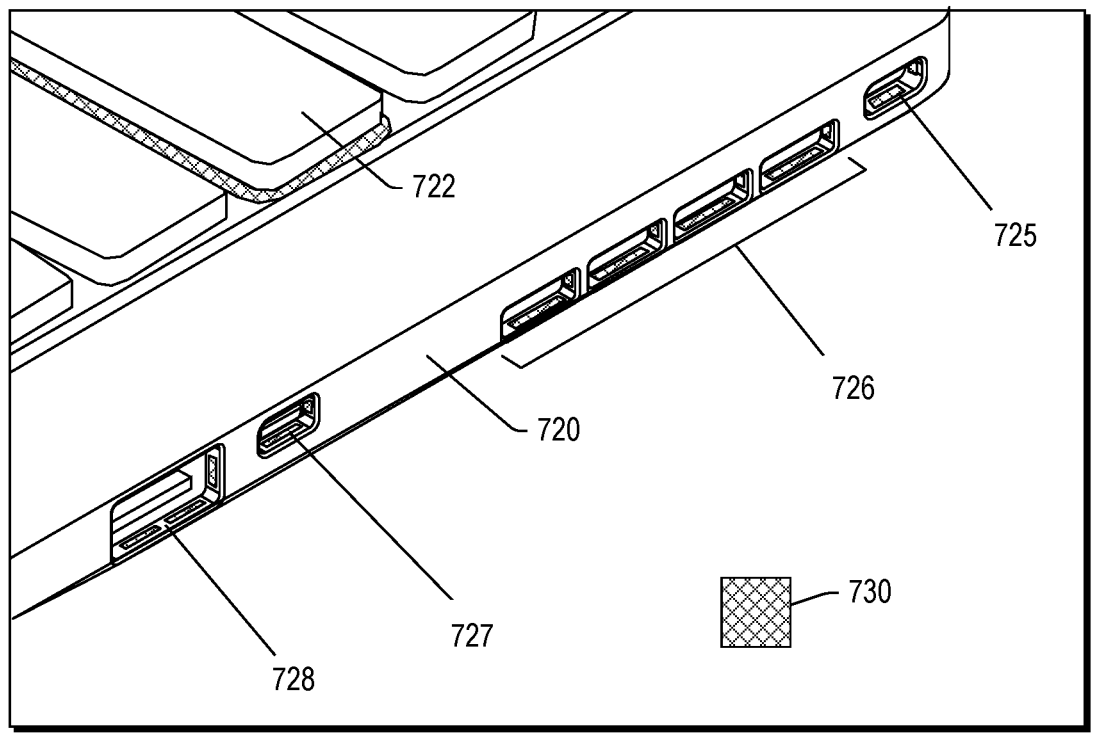
FIG. 7 is a diagram of an example of a portion of a device.

FIG. 7 shows some examples of connectors (e.g., ports, etc.) and openings of a computing device, which is shown to be a keyboard housing 720 of a computing device. As shown, the connectors and openings can include a security lock slot 725, air flow openings 726 (e.g., in fluid communication with passages of a fan, etc.), a network connector 727 and a serial bus connector 728 (e.g., USB 3.0, etc.). In FIG. 7, the connectors and openings are shown to be part of a keyboard housing, which can be part of a notebook computing device (see, e.g., FIGS. 1, 2, 3, 4, etc.). As shown in FIG. 7, cross-hatched regions correspond to water absorbent material 730 regions. In such an example, upon exposure to liquid water, the water absorbent material 730 regions can expand to greater volume that can occupy the space of the connectors and openings, which can act to hinder flow of water from an exterior space to an interior space of the keyboard housing 720.

As an example, in FIG. 7, the keys of the keyboard housing 720 can include a water absorbent material. For example, a perimeter of a key 722 can include a ring (e.g., a gasket) of a water absorbent material that expands responsive to exposure to liquid water where expansion can apply pressure that forces the key 722 into an undepressed position where the water absorbent material is form filling to create a substantially water impermeable seal about the key. In FIG. 7, the water absorbent material 730 is shown for the single key 722; noting that it may be present for more keys where such keys may be all keys or keys that are proximate to particular components in the keyboard housing 720. As an example, a spill pattern may be utilized to determine which keys of a keyboard housing can benefit from presence of a water absorbent material such as a gasket that can swell to form a water barrier upon exposure to liquid water where that water barrier can hinder flow of water from an exterior space to an interior space of the keyboard housing.

Figure 8:
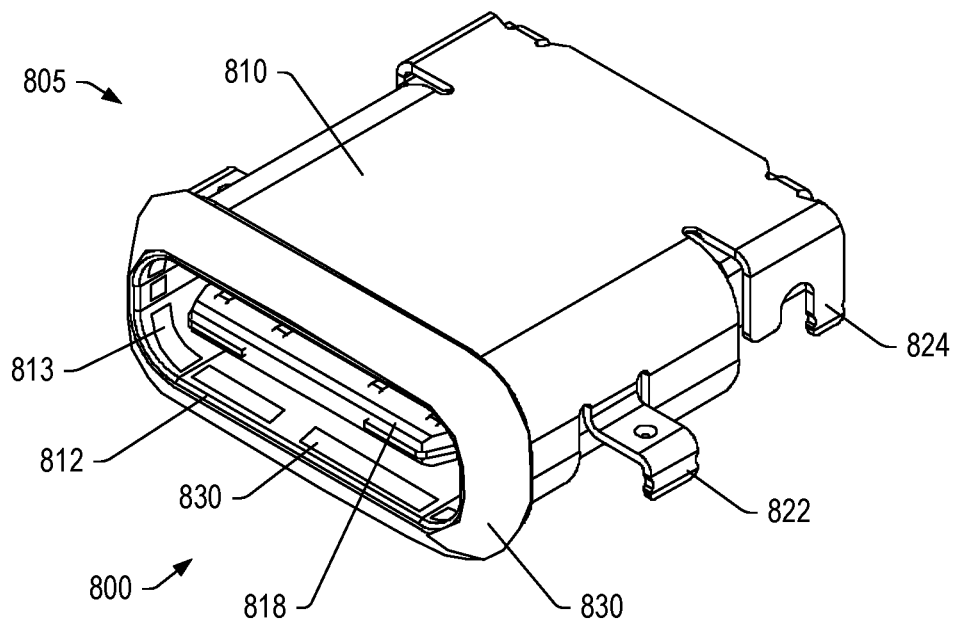
FIG. 8 is a series of diagrams of an example of an assembly in two different states.
Figure 8:
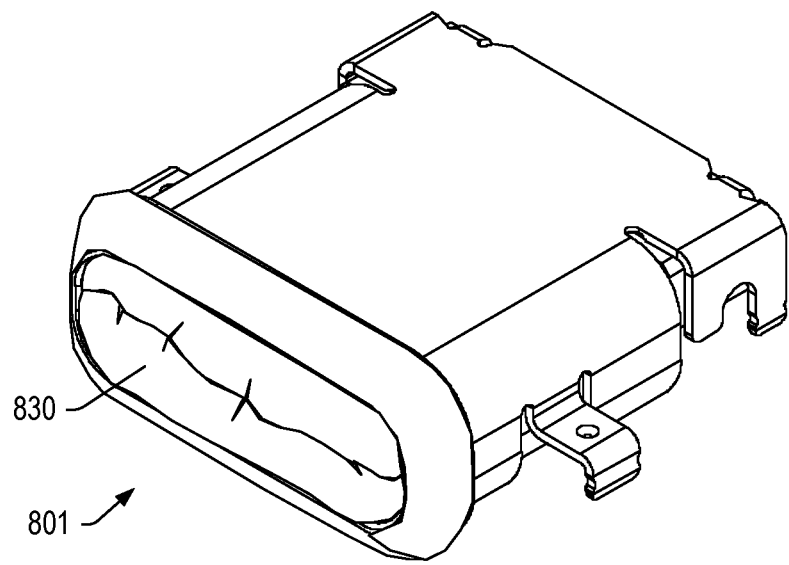

FIG. 8 shows an example of an assembly 805 in a dry state 800 and an example of the assembly 805 in a wet state 801. As shown, the assembly 805 includes a housing 810 with an opening 812 for electrical contacts 818 where the housing 810 can be mounted to a board or other component using various physical connector features 822 and 824, which can be prongs, pins, etc. As shown, the assembly 805 can be a serial bus connector such as, for example, a USB connector. In the example of FIG. 8, the assembly 805 is shown as being a female connector that can receive a male connector. For example, the assembly 805 can be a socket for a plug where it can be a USB socket for a USB plug of an electrical component, an electrical cable, etc. As an example, the assembly 805 can be mounted in a housing of a computing device such as, for example, a notebook computing device, a tablet computing device, etc.

As shown in the example of FIG. 8, the assembly 805 can include a material 830 that responds to water by expanding such that the opening 812 is filled and sealed to form a barrier to water. As an example, the material 830 can be in the form of a gasket where it can be fit into a receptacle of a housing and where it can expand inwardly to fill the opening. For example, the material 830 can be a dual-purpose material that is a support gasket in the dry state 800 and that is a filler in the wet state 801. To achieve such dual purposes (e.g., dual functionality), the housing 810 can include gaps 813 (e.g., openings, cut-outs, voids, etc.) whereby the material 830 can expand inwardly through the gaps 813. As mentioned, the material 830 can be a gasket that is fit about a perimeter of the housing 810, which may help to secure, stabilize, etc., the housing 810 in a housing of a computing device. For example, the material 830 can be resilient such that movement due to manual connection and disconnection of a plug from the opening 812 is absorbed, which may help to lengthen the lifetime of the assembly 805, provide for suitable ergonomic feel, etc. Such resiliency may also help to protect against mechanical forces applied to a plug that is at least in part in the opening 812. For example, consider a USB cable with a plug that is received by the opening 812 of the housing 810 where a pulling force is applied to the cable where the force can be transferred to the plug and hence the housing 810, which may place the physical connector features 822 and 824 at risk of loosening (e.g., and/or electrical connection features at risk of loosening). In such an example, where the material 830 is resilient, it can absorb some of the shock, for example, via elastic deformation, which may be of the order of 0.1 mm or more (e.g., consider inclusion of a natural rubber, a synthetic rubber, etc., in the material 830). As an outer surface of the material 830 may be constrained by a housing of a computing device, upon exposure to water, the material 830 can expand inwardly rather than outwardly whereby inward expansion results in filling of the opening 812, as illustrated in the wet state 801 of FIG. 8.

Figure 9:
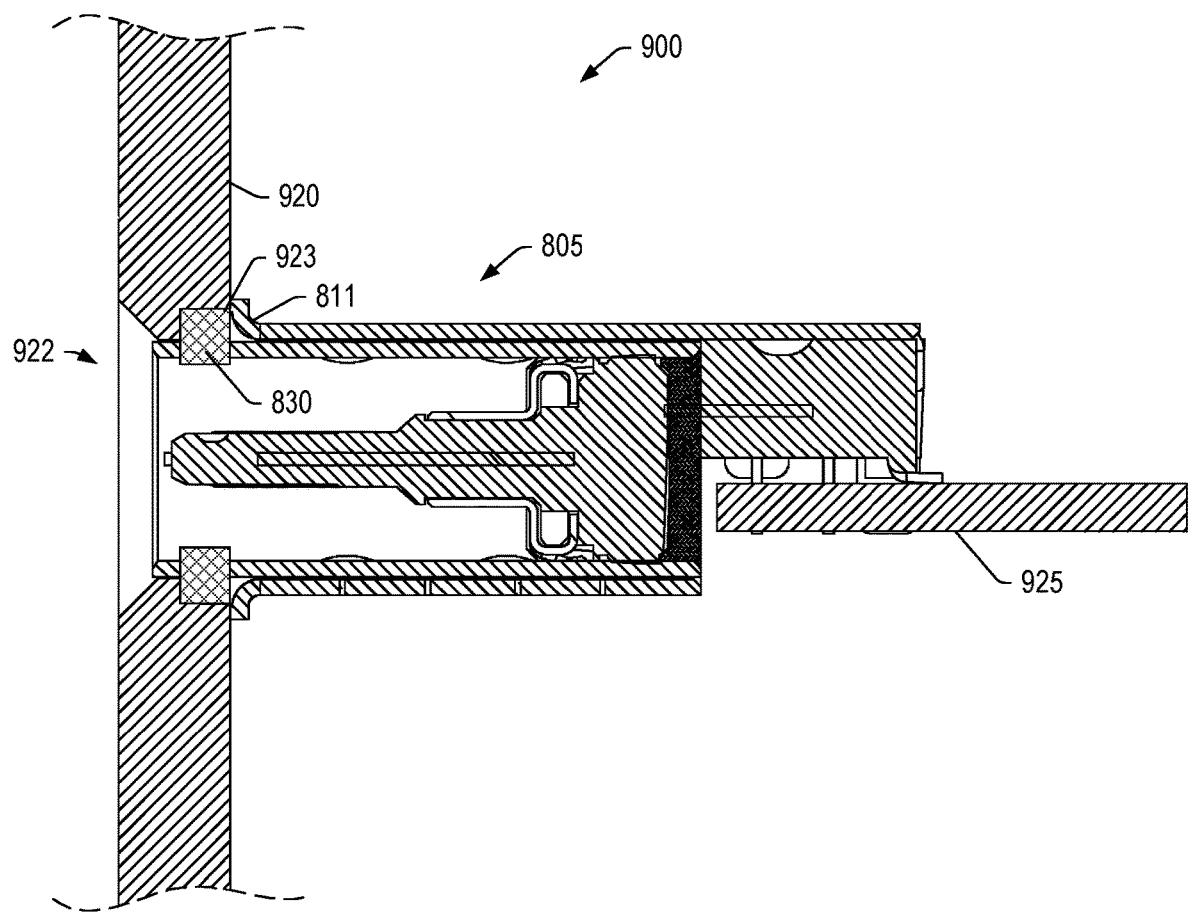
FIG. 9 is a cross-sectional diagram of the assembly of FIG. 8 in a first state.

FIG. 9 shows an example of an assembly 900 that includes the assembly 805 in the dry state 800 as mounted to a housing 920 of a computing device and as mounted to a board 925 of the computing device where an opening 922 in the housing 920 provides for access to the opening 812 of the assembly 805. As shown in the cross-sectional view of FIG. 9, the material 830 is a gasket that is seated at least in part in a recess 923 of the housing 920 such that an outer perimeter (e.g., an outer surface) of the material 830 is physically constrained by the housing 920. Further, as shown, the housing 810 includes a lip 811, which may also physically constrain the material 830.

Figure 10:
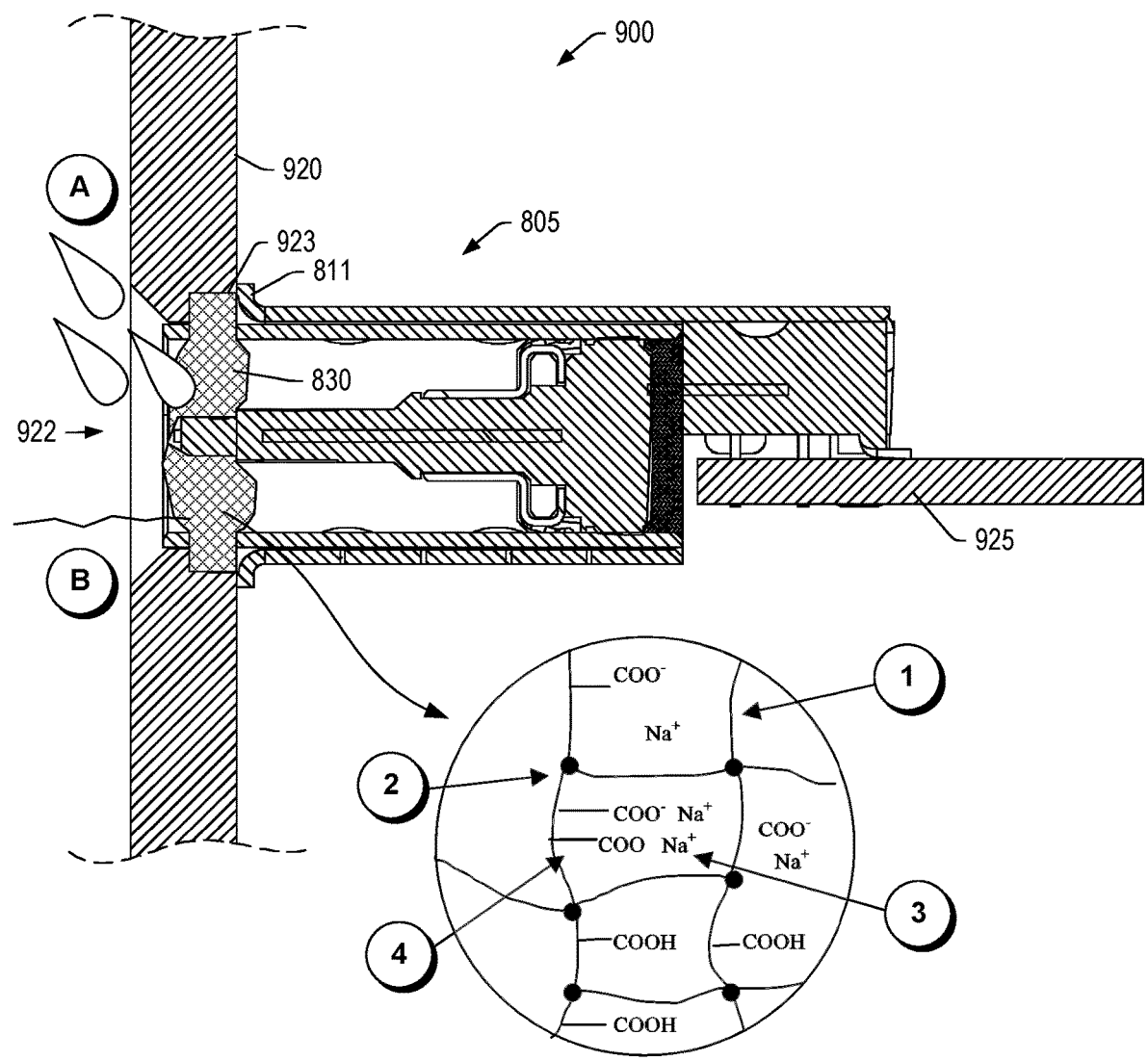
FIG. 10 is a cross-sectional diagram of the assembly of FIG. 8 in a second state, along with a schematic diagram of an example of material.

FIG. 10 shows an example of the assembly 900 in a wet state upon exposure to water via one or more mechanisms, labeled A and B. As to mechanism A, it can be due to water in droplet form (e.g., rain, spraying of sprinklers, etc.) that contacts the material 830; whereas, as to mechanism B, it can be due to water rising to a level such that it contacts the material 830. As explained, a portion of the material 830 can be constrained physically whereas another portion of the material 830 can expand into a space defined by the opening 812. In such an example, inward expansion of the material 830 can fill a volume at the opening 812 of the housing 800 of the assembly 805 to create a barrier that hinders flow of water from an exterior of the housing 920 to an interior of the housing 920. As an example, the material 830 may expand in a manner that it covers the electrical contacts of the assembly 805 as otherwise accessible via the opening 812. For example, in the cross-sectional view of FIG. 10, the material 830 can expand toward the right to fill the space within the housing 810 where the electrical contacts are present.

FIG. 10 also shows an example of an approximate schematic view of a portion of an example of material that can be suitable for use in an assembly, a device, etc. As shown in the example material, it can include (1) polymer chains (e.g., tailored as to hydrophilicity, hydrophobicity, balance, etc.), (2) cross-links between at least some chains (e.g., to limit swelling), (3) dissociated ions (e.g., sodium, potassium, etc.) of carboxylate groups that result in an increase in osmotic pressure in a formed gel where electrical neutrality can be maintained as the dissociated ions can be trapped in the gel, and (4) repulsion between negative charges of the carboxylate groups that can expand coiled polymeric regions.

Figure 11:
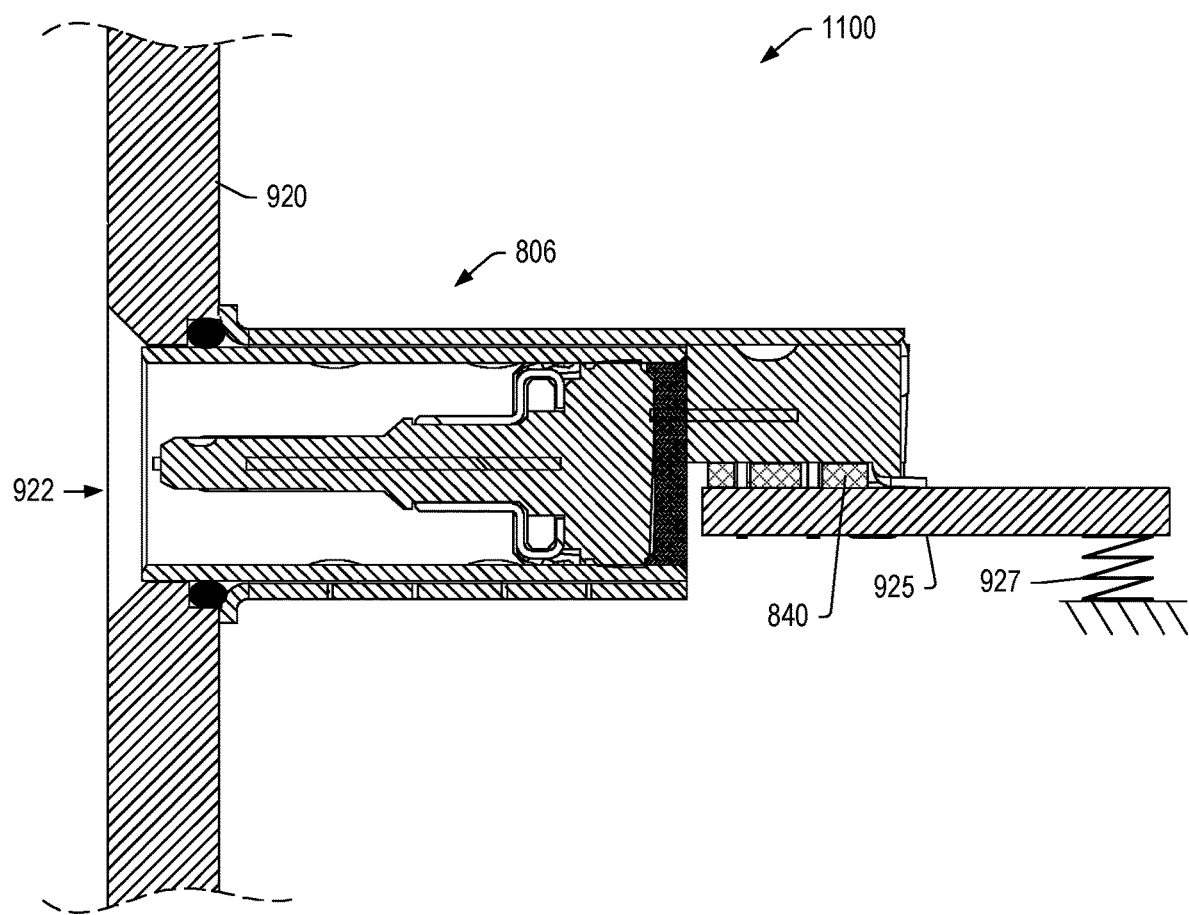
FIG. 11 is a cross-sectional diagram of an example of an assembly in a first state.

FIG. 11 shows an example of an assembly 1100 in a dry state that includes an assembly 806, which can include one or more of the features of the assembly 805. As shown, the assembly 1100 includes material 840, which is disposed between a portion of the assembly 806 and a portion of the board 925 where electrical connections may be present between the assembly 806 and the board 925 (e.g., a PCB, etc.).

As an example, the board 925 may be biased by a spring 927, which can be approximately characterized using Hooke's law where $F=k\Delta X$ where X may be defined in a manner to provide an appropriate direction of force, F, and where a spring constant, k, may be selected in combination with one or more characteristics of the material 840. For example, upon exposure to water the material 840 can swell and apply a force that is greater than the force applied by the spring 927 such that the board 925 can be moved a distance that causes the spring 927 to compress, which can be a distance sufficient to electronically disconnect circuitry of the assembly 806 from circuitry of the board 925.

Figure 12:
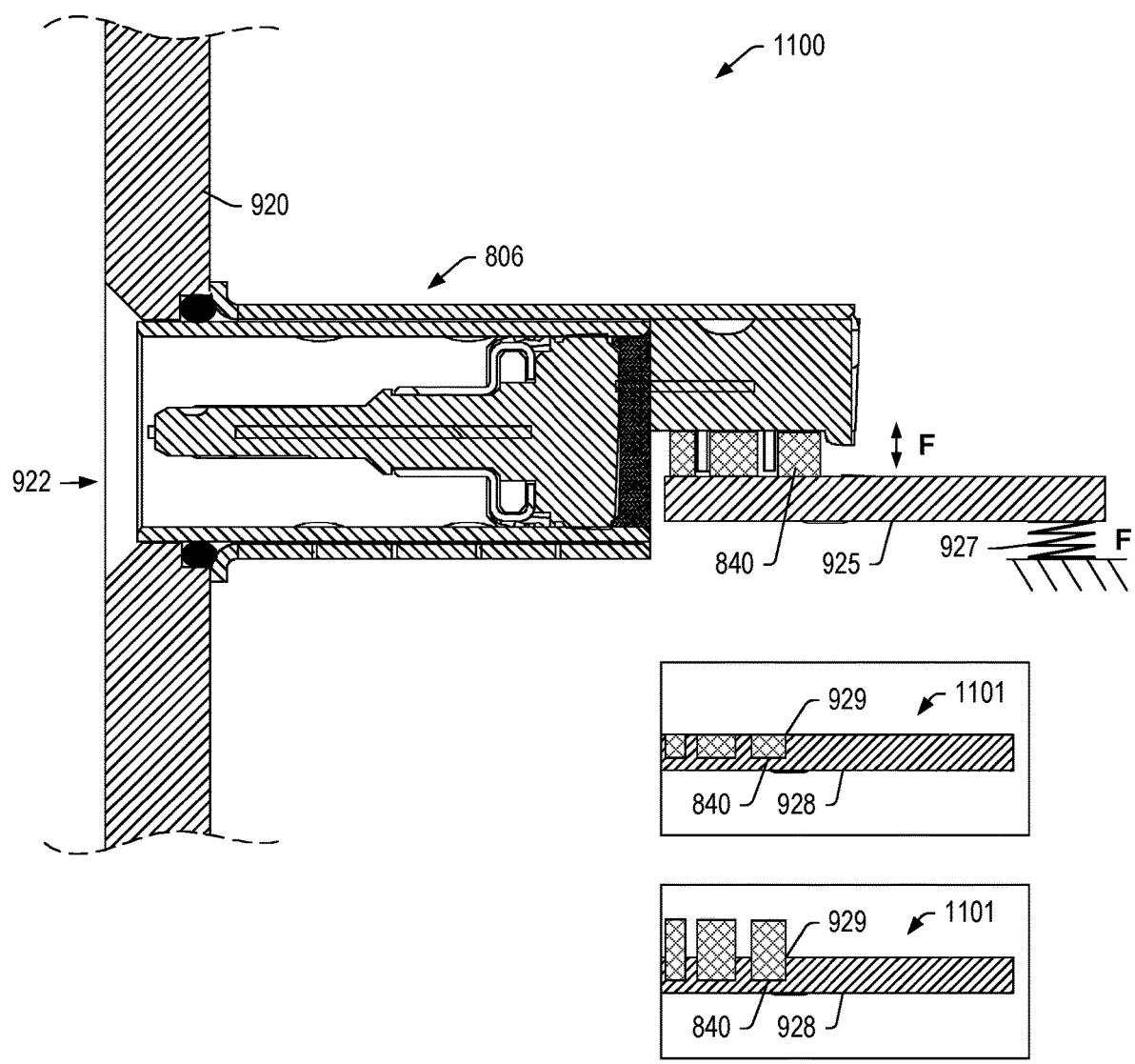
FIG. 12 is a cross-sectional diagram of an example of an assembly in a second state, along with cross-sectional diagrams of another example of an assembly in a first state and a second state.

FIG. 12 shows the example assembly 1100 in a wet state where the material 840 has expanded to apply pressure that causes an electrical disconnection between the assembly 806 and circuitry of the board 925. In such an example, where a plug is received by the assembly 806 via the opening 922 of the housing 920, electrical connection(s) between the plug and circuitry of the board 925 can be disconnected.

FIG. 12 shows a double headed arrow with a label "F", representative of force applied by expansion of the material 840 in response to contact with liquid water. As shown, the force can be sufficient to cause displacement of a portion of the assembly 806 from the board 925.

As mentioned, the board 925 can be spring-biased or otherwise have a clearance such that it can move responsive to the applied force. For example, FIGS. 11 and 12 show the spring 927 in a first state (FIG. 11) and in a second state (FIG. 12) where the spring 927 is compressed in the second state responsive to exposure of the material 840 to water.

As an example, a PCB can be mounted on one or more spring-biased bosses that provide for movement sufficient to decouple electrical contacts of a board from electrical contacts of one or more components (e.g., single components, assembled components, etc.).

As an example, the board 925 may be resilient such that it can deform responsive to the applied force to provide for movement at the electrical contacts by a distance that allows for electrically decoupling the assembly 806 from the board 925.

As explained with respect to FIG. 6, a board can include a groove that is filled at least in part with a material that responds to exposure to water as a liquid. As an example, the board 925 may include one or more of such grooves and material. FIG. 12 shows an example of a portion of an assembly 1101 in a dry state (e.g., a first state) and an example of a portion of the assembly 1101 in a wet state (e.g., a second state). As shown, a board 928 includes one or more grooves 929 that receive the material 840 where, upon exposure to liquid water, the material 840 can expand in a direction outwardly from the one or more grooves 929. In such an example, the material 840 can apply force to another component, components, etc., to cause an electrical disconnect (e.g., or electrical disconnects). In such an example, one or more spring-based features may be utilized. For example, consider a spring such as the spring 927, etc.

As an example, a printed circuit board can include grooves where the grooves can be positioned proximate to one or more electrical conductors that electrically couple to one or more other components. In such an example, where the grooves include water swellable material, upon exposure to liquid water, the material can swell and cause force to be applied that can result in electrical disconnection of one or more components. As an example, a PCB may be milled to provide a groove in particular region of the PCB where water swellable material can be disposed at least in part in the groove where, upon exposure to liquid water, the water swellable material expands to apply a force that causes an electrical disconnect to occur.

In the examples of FIGS. 8, 9, 10, 11 and 12, the materials 830 and 840 can be the same or may differ. As explained, a material can be a multi-purpose material, which can provide a structural purpose (e.g., a mechanical purpose) and an anti-water damage purpose. As mentioned, a structural purpose can be with respect to mechanical motion such as vibration, mechanical force, shock, etc. As to an anti-water damage purpose, it may be for absorbing water to perform sealing and/or disconnecting (e.g., electrically disconnecting).

Figure 13:
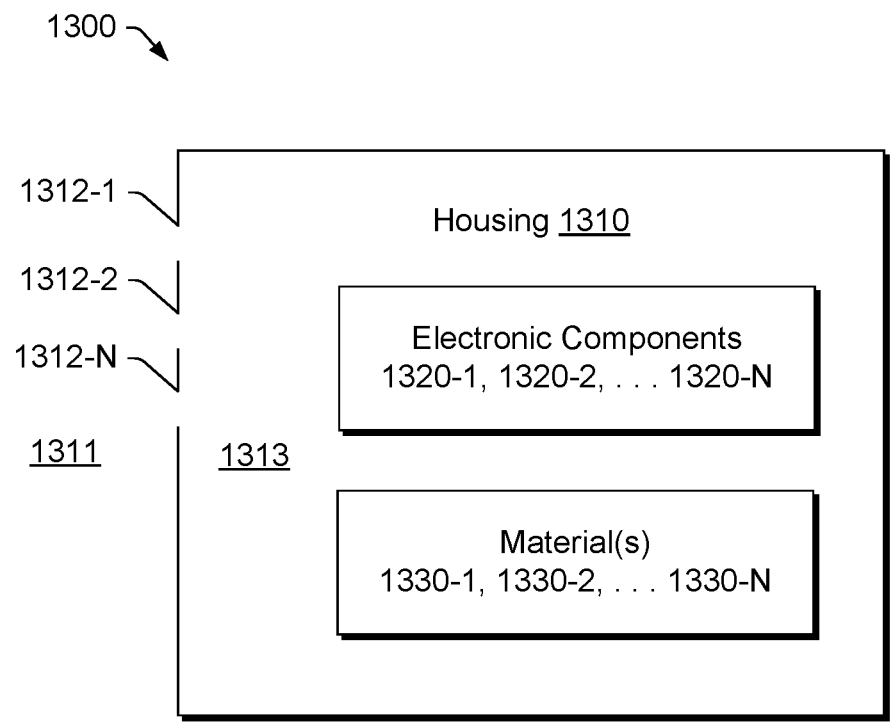
FIG. 13 is a diagram of an example of a device.

FIG. 13 shows an example of a device 1300 that can include a housing 1310 that defines an interior space 1313 and an exterior space 1311 and that includes air passages 1312-1, 1312-2, . . . 1312-N between the interior space 1313 and the exterior space 1311; electronic components 1320-1, 1320-2, . . . 1320-N disposed in the interior space 1313 of the housing 1310, where the electronic components 1320-1, 1320-2, . . . 1320-N include a processor and memory accessible to the processor; and one or more materials 1330-1, 1330-2, ... 1330-N that, upon exposure to water, transitions from a first state to a second state that protects at least one of the electronic components 1320-1, 1320-2, ... 1320-N from damage.

As an example, a device can include a housing that defines an interior space and an exterior space and that includes air passages between the interior space and the exterior space; electronic components disposed in the interior space of the housing, where the electronic components include a processor and memory accessible to the processor; and a material that, upon exposure to water, transitions from a first state to a second state that protects at least one of the electronic components from damage. In such an example, the material can be in the form of a product that is positioned within or on the housing of the device to protect from damage due to exposure to water.

As an example, a product, which can be material or include material that, upon exposure to water, transitions from a first state to a second state, can be formed via one or more methods, which may depend on characteristics of a device such as, for example, a spill pattern of a device, positions of openings of a device, orientation of a device with respect to gravity (e.g., as on a tabletop, desktop, in a bag, a briefcase, etc.). As an example, a product may be made such that the product is customized for a particular device (e.g., zoned, layered, etc.). As an example, a product can be provided in a form that can be sized for particular positioning. For example, consider a sheet, a tape, etc., where various portions of the sheet, of the tape, etc., can be cut and positioned with respect to a housing of a device, components within the housing of the device, etc.

As an example, material can transition from a second state that is a wet state to a first state that is a dry state (e.g., a drier state). For example, upon drying, a material can transition from a second state back to a first state. As an example, upon drying, a material may transition from a second state (e.g., a wet state) to a third state. In such an example, the third state can be a fine particulate state. For example, consider a water absorbent material As an example, material can be or include a water absorbent. As an example, a product can be or include a water absorbent. As an example, a water absorbent can be or include a superabsorbent polymer (SAP), which can be referred to as a SAP material. As an example, a material can include a superabsorbent polymer (SAP).

As an example, a material can include one or more of polyacrylate, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile.

As an example, a material can be water-reactive in that it can transition from a first state to a second state upon exposure to water. As an example, a material can be water-sensitive in that it can transition from a first state to a second state upon exposure to water. As an example, a water-reactive and/or a water-sensitive material may act via hydrogen bond formation and/or via one or more other types of bond formation (e.g., and/or bond breaking).

As an example, a device can include a housing that defines an interior space and an exterior space and that includes air passages between the interior space and the exterior space; electronic components disposed in the interior space of the housing, where the electronic components include a processor and memory accessible to the processor; and a material that, upon exposure to water, transitions from a first state to a second state that protects at least one of the electronic components from damage. In such an example, in the first state, an electrical circuit that includes one of the electronic components can be electronically connected and, in the second state, the electrical circuit can be electronically disconnected. In such an example, the material can generate a force as it transitions from the first state to the second state, where the force spatially separates electrically conductive features of the electrical circuit to electronically disconnect the electrical circuit. As an example, in at least the second state, the material can be an electrical insulator.

As an example, a device can include a battery where, in a second state, an electrical circuit is electronically disconnected from the battery. As an example, a device can include an electrical power connector where, in a second state, an electrical circuit is electronically disconnected from the electrical power connector.

As an example, a first state can be a fluid permeable state and a second state can be a fluid impermeable state. For example, consider swelling of material that causes the material to have a pressure drop that prohibits flow of water across a thickness of the material absent a sufficiently high driving force (e.g., a driving force not normally present for a computing device).

As an example, a first state can be a water intrusive state for intrusion of water into material. For example, a material can include voids, capillaries, etc., where water can intrude the material via such voids, capillaries, etc. As an example, a material can include one or more fibrous materials, which can include one or more cellulosic materials that can be hydrophilic and provide for wicking and transport of water.

As an example, a first state of material can be an air permeable state and a second state of the material can be a water impermeable state. For example, the air permeable state can be an air-convective state that transfers heat energy generated by operation of at least one electronic component of a device via air convection. As an example, consider a membrane where, upon exposure to water, air passages in the membrane close due to expansion of water absorbent material in the membrane, which may include SAP material. As an example, a second state can be a gel state that is an air impermeable state.

As an example, in a first state, material can be of a first volume and, in a second state, the material can be of a second volume that is greater than the first volume. In such an example, the second volume may be a constrained volume that is constrained by one or more surfaces of a device (e.g., a housing surface, etc.). As an example, material can expand to be form filling (e.g., space filing) of a space defined by one or more surfaces.

As an example, in a first state, material can have a first mass and, in a second state, the material can have a second mass that is greater than the first mass. In such an example, the increase in mass can be due to water absorbance of the material, which can include a SAP material.

As an example, material can be in the form of a sheet. As an example, material can include an adhesive. As an example, material can be in the form of foam. As an example, material can be a sprayed material. As an example, an adhesive may be sprayed to bond a water absorbent material to a surface. As an example, a monomeric material may be sprayed onto a substrate for purposes of in-situ polymerization that forms a water absorbent polymeric material. As an example, a product can include a substrate and water absorbent polymeric material.

As an example, material can be in the form of a gasket. As an example, a gasket is disposed about a portion of a connector where, for example, the connector is a female connector. In such an example, the material can expand upon exposure to water to cause a sealing off of an opening of the female connector and, for example, covering of one or more electrical contacts of the female connect. As an example, a gasket can be disposed about an air passage. In such an example, upon exposure to water, the gasket can expand to close the air passage, which can make the closed off air passage a barrier to flow of water.

As an example, material can be disposed adjacent to an air passage (e.g., or air passages), where, in a first state of the material, the air passage is open, and where, in a second state of the material, the air passage is closed. As an example, in the second state, at least a portion of the material may flow from an interior space to an exterior space via the air passages. For example, consider material disposed along a perimeter of an opening of an air passage whereby the material expands upon contact with water to fill and flow partially out of the opening.

As an example, material can transition from a first state to a second state upon exposure to water where, in the second state, the viscosity of the material is greater than 1 MPa-s (water at 20 C) and less than 104 MPa-s. As an example, in a second state, material may be flowable upon exposure to sufficient pressure, gravity, etc. For example, in a second state, material may creep. For example, in a second state, material can be a viscoelastic material that experiences a time-dependent increase in strain when subjected to stress. As an example, in a second state, material may creep out of a housing over an extended period of time. For example, consider a notebook computer being oriented with an opening downwardly with respect to gravity such that mass of the material causes the material to creep out of the opening over a period of time greater than approximately 60 minutes. In such an example, the material may be substantially removed from the housing after a risk of water damage has been abated through use of the material (e.g., transitioning it from a first state (e.g., a dry state) to a second state (e.g., a wet state)).

As an example, in a second state, material can be thixotropic. In such an example, the material can become less viscous over time when shaken, agitated, or otherwise stressed. For example, consider shaking a device to decrease viscosity of material therein to cause the material to become less viscous and to flow out of the device. As an example, upon exposure to stress, material can transition from a second state to a less viscous third state.

As an example, a device can include a fan, where, upon drying of material in a housing of the device, the material transitions from a second state to a particulate state removable at least in part from an interior space of the housing by operation of the fan. For example, consider the device being exposed to a flow of water (e.g., a water spill, etc.) where material transitions from a first state to a second state where the second state of the material acts to protect components of the device from water damage. In such an example, upon drying, the material can transition to a state that can be moved by the flow of air such as air driven by a fan, air driven by a vacuum, etc., to remove at least a portion of the material.

As an example, a state of material can be a gel state, which may be a hydrogel state. As an example, a gel state can be a wet state where material has transitioned to the wet state from a dry state.

As an example, in a gel state, material can be shock absorbing. For example, consider a housing of a computing device that is exposed to water such that material therein transitions to a gel state by absorbing at least a portion of the water. In such an example, the gel state can be a shock absorbing state that can absorb mechanical shock (e.g., energy) that may occur if the device is dropped or otherwise comes into contact with something, which could be a relatively hard surface. For example, upon sliding of the device off a surface and onto a floor, the material can be in a gel state that protects at least a portion of the electronic components from mechanical shock.

As an example, material in a housing of a device can transition from a first state that is a dry state to a second state that is a wet state responsive to exposure to liquid water where, in the second state, the material can include a shock absorbing gel that protects at least one or more electronic components in the housing from mechanical damage due to mechanical shock.

As an example, a housing can include a keyboard, where the housing can be referred to as a keyboard housing. Such a keyboard can be a mechanical keyboard with depressible keys, which can be spring loaded to return after mechanical depression. As an example, a housing can include a display. For example, consider a housing of a tablet device, which may be referred to as a tablet housing.

As an example, a method can include, in a device that includes a housing that defines an interior space and an exterior space and that includes air passages between the interior space and the exterior space, electronic components disposed in the interior space of the housing that include a processor and memory accessible to the processor, and a material, transitioning the material, responsive to exposure to water, from a first state to a second state to protect at least one of the electronic components from damage.

As an example, a method can include making a product that includes water absorbent material and positioning the product in a housing and/or on a housing of a computing device.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
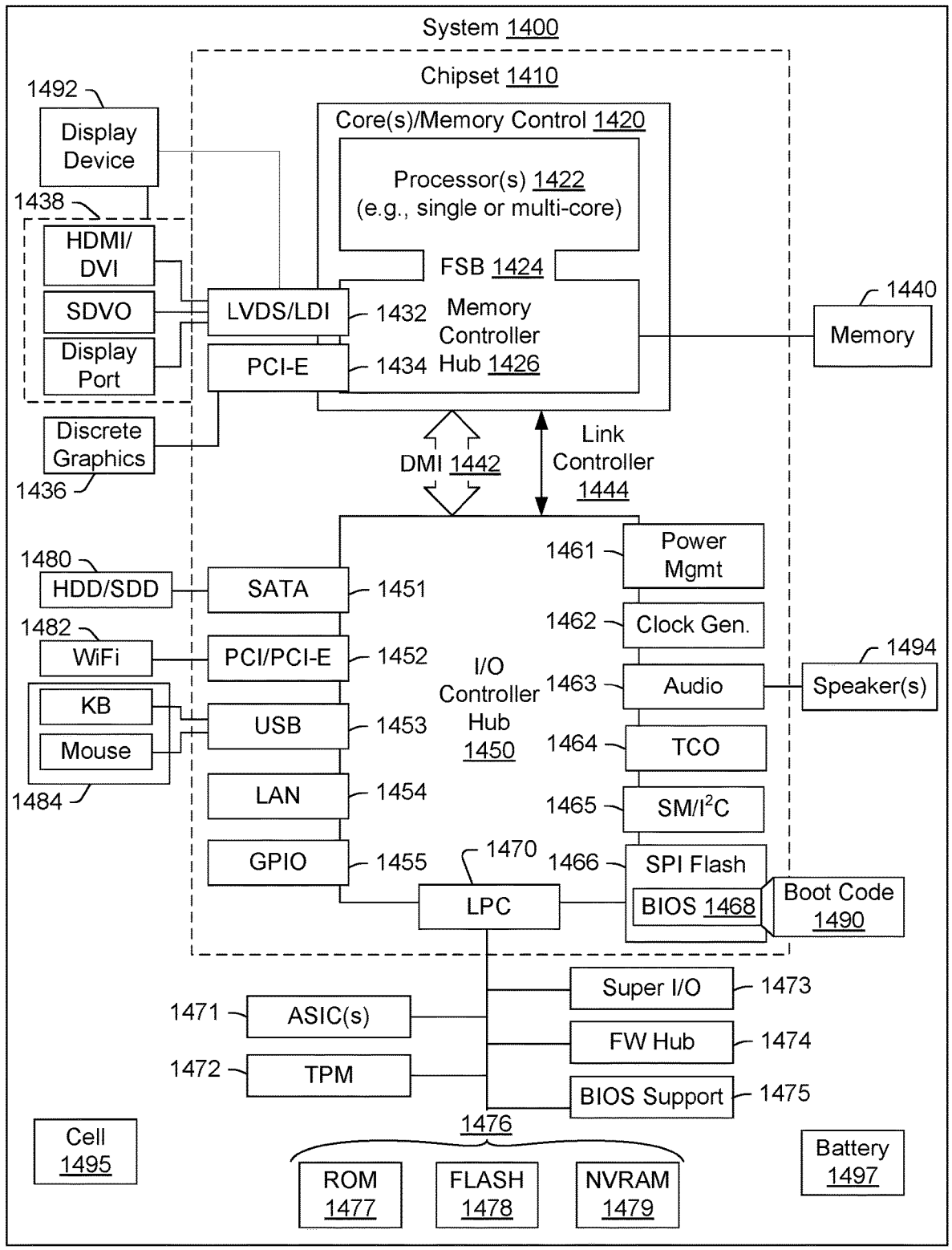
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.). As an example, the device 1300 of FIG. 13 can include one or more features of the system 1400 of FIG. 14.

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:
1. A device comprising:
a housing that defines an interior space and an exterior space and that comprises air passages between the interior space and the exterior space;

electronic components disposed in the interior space of the housing, wherein the electronic components comprise a processor and memory accessible to the processor; and a material that, upon exposure to water, transitions from a first state to a second state that protects at least one of the electronic components from damage, wherein, in the first state, an electrical circuit that comprises at least one of the at least one of the electronic components is electronically connected and wherein, in the second state, the electrical circuit is electronically disconnected.

2. The device of claim 1, wherein, upon drying, the material transitions from the second state to the first state.

3. The device of claim 1, wherein, upon drying, the material transitions from the second state to a third state, wherein the third state is a particulate state.

4. The device of claim 1, wherein the material is water absorbent.

5. The device of claim 1, wherein the material comprises a superabsorbent polymer.

6. The device of claim 1, wherein the material comprises a member selected from a group consisting of polyacrylate, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile.

7. The device of claim 1, wherein the material generates a force as it transitions from the first state to the second state, wherein the force spatially separates electrically conductive features of the electrical circuit to electronically disconnect the electrical circuit.

8. The device of claim 1, wherein, in at least the second state, the material comprises an electrical insulator.

9. The device of claim 1, wherein the device comprises a battery and wherein, in the second state, the electrical circuit is electronically disconnected from the battery.

10. The device of claim 1, wherein the device comprises an electrical power connector and wherein, in the second state, the electrical circuit is electronically disconnected from the electrical power connector.

11. The device of claim 1, wherein, in the second state, the material comprises a shock absorbing gel that protects at least one of the electronic components from mechanical damage due to mechanical shock.

12. The device of claim 1, wherein the first state is a fluid permeable state and wherein the second state is a fluid impermeable state.

13. The device of claim 1, wherein the first state is an air permeable state and wherein the second state is a water impermeable state.

14. The device of claim 13, wherein, the air permeable state is an air-convective state that transfers heat energy generated by operation of at least one of the electronic components via air convection.

15. The device of claim 14, wherein the second state is an air impermeable state.

16. The device of claim 1, wherein, in the first state, the material comprises a first volume and wherein, in the second state, the material comprises a second volume that is greater than the first volume.

17. The device of claim 1, wherein the material comprises a sheet.

18. The device of claim 1, wherein the material comprises an adhesive.

19. The device of claim 1, wherein the material comprises a gasket.

* * * * *